(12) United States Patent
Yin et al.

(10) Patent No.: US 10,641,505 B2
(45) Date of Patent: May 5, 2020

(54) THERMAL EQUILIBRIUM SYSTEM FOR BUILDING AND ENERGY-SAVING AIR-CONDITIONING SYSTEM USING THE SAME

(71) Applicant: RUENTEX ENGINEERING & CONSTRUCTION CO., LTD., Taipei (TW)

(72) Inventors: Samuel Yin, Taipei (TW); Wu-Sung Chen, Taipei (TW)

(73) Assignee: RUENTEX ENGINEERING & CONSTRUCTION CO., LTD., Taipei (TW)

( * ) Notice: Subject to any disclaimer, the term of this patent is extended or adjusted under 35 U.S.C. 154(b) by 141 days.

(21) Appl. No.: 16/115,697

(22) Filed: Aug. 29, 2018

(65) Prior Publication Data

US 2019/0063766 A1  Feb. 28, 2019

(30) Foreign Application Priority Data

Aug. 30, 2017 (TW) .............................. 106129531 A

(51) Int. Cl.
*F24F 5/00* (2006.01)
*F24F 11/84* (2018.01)
(Continued)

(52) U.S. Cl.
CPC .......... *F24F 5/0046* (2013.01); *F24F 5/0017* (2013.01); *F24F 11/84* (2018.01);
(Continued)

(58) Field of Classification Search
CPC .......... F24F 5/0046; F24F 11/84; F24F 11/85; F24F 5/0017; F24F 2110/64;
(Continued)

(56) References Cited

U.S. PATENT DOCUMENTS

| 10,563,872 B2* | 2/2020 | Yasuo ...................... F24F 11/89 |
| 2007/0044951 A1* | 3/2007 | Horn ................... B60H 1/00492 |
| | | 165/203 |

(Continued)

FOREIGN PATENT DOCUMENTS

| TW | M494898 U | 2/2015 |
| TW | M496736 U | 3/2015 |
| TW | I560411 B | 12/2016 |

OTHER PUBLICATIONS

Office action from Taiwan Patent Office dated Feb. 23, 2018, for the corresponding Taiwan application 106129531, 6 pp. in Chinese.

*Primary Examiner* — Jon T. Schermerhorn, Jr.
(74) *Attorney, Agent, or Firm* — Juan Carlos A. Marquez; Marquez IP Law Office, PLLC

(57) ABSTRACT

A thermal equilibrium for building and an energy-saving air-conditioning system using the same incorporates a first energy-recovery apparatus and a second energy-recovery apparatus. The first energy-recovery apparatus includes a first water storage tank, a foundation pile under and connected to a building architecture construction and a first heat-exchanging pipeline connected to the first water storage tank for performing heat exchange with the foundation pile so that the water in the first heat-exchanging pipeline is heated to a first temperature range. The second energy-recovery apparatus includes a second water storage tank, at least one home appliance that generates a first thermal energy during operation, and a second heat-exchanging pipeline connected to the second water storage tank for performing heat exchange with the at least one home appliance so that the water in the second heat-exchanging pipeline is heated to a second temperature range.

36 Claims, 8 Drawing Sheets

(51) Int. Cl.
*F24F 11/85* (2018.01)
*F24F 110/64* (2018.01)
*F24F 140/20* (2018.01)
*F24F 110/70* (2018.01)
*F24F 110/20* (2018.01)
*F24F 11/00* (2018.01)
*F24F 110/10* (2018.01)
*F24F 6/00* (2006.01)

(52) U.S. Cl.
CPC ................ *F24F 11/85* (2018.01); *F24F 6/00* (2013.01); *F24F 11/0008* (2013.01); *F24F 2005/0025* (2013.01); *F24F 2005/0057* (2013.01); *F24F 2110/10* (2018.01); *F24F 2110/20* (2018.01); *F24F 2110/64* (2018.01); *F24F 2110/70* (2018.01); *F24F 2140/20* (2018.01)

(58) Field of Classification Search
CPC ............... F24F 2110/70; F24F 2110/10; F24F 2140/20; F24F 6/00; F24F 11/0008
See application file for complete search history.

(56) References Cited

U.S. PATENT DOCUMENTS

2016/0238265 A1* 8/2016 Sherbeck ............ F16K 11/0833
2018/0238566 A1* 8/2018 De' Longhi .............. F25B 6/04

\* cited by examiner

THERMAL EQUILIBRIUM SYSTEM FOR BUILDING AND ENERGY-SAVING AIR-CONDITIONING SYSTEM USING THE SAME

FIELD OF THE INVENTION

The present invention is related to a thermal equilibrium system for building and an energy-saving air-conditioning system using the same, and in particular to a thermal equilibrium system which recycles underground thermal energy absorbed by foundation piles and waste heat generated from home appliances.

BACKGROUND OF THE INVENTION

Many modern buildings are much taller and heavier than the buildings before them. The foundation piles deeply fixed into the ground or rock are widely adopted as the basis for supporting the buildings and maintain the stability of the same. The temperature variation of the soil around the foundation pile that is deeply fixed into the ground is much more stable as compared with the changing atmosphere temperatures where the building is located. Although the temperature of the soil changes along with different latitudes and seasons, it does not change drastically like the atmospheric temperature which will obviously change along with latitudes, climate, weather and even different times of the day. Therefore, based on the principle of heat exchange, appropriately utilizing the foundation pile to absorb thermal energy from underground for use in a building or a house improves energy efficiency and achieves the goal of green building.

In addition, many home appliances, such as a microwave oven, electric oven, refrigerator, electric cooker, induction cooker, steamer, air-conditioner and heating stove, are needed to satisfy the requirements of the modern lifestyle of a family. Normally, those home appliances will generate waste heat during operation and release thermal energy directly to the air without being properly recycled for use, and this is not environmentally friendly.

Therefore, if we can recycle the underground thermal energy or waste heat of the home appliances as mentioned above, it can be expected that a building or living environment with better energy efficiency can be achieved.

SUMMARY OF THE INVENTION

An object of the invention is to provide a thermal equilibrium system for a building which is able to utilize underground thermal energy from a foundation pile to proceed with environmental control of a building or a house.

The other object of the invention is to provide a thermal equilibrium system for a building which is able to utilize the waste heat generated from the home appliances to proceed with environmental control of a building or a house.

Another object of the invention is to provide an energy-recycling air-conditioning system which can utilize the recycled thermal energy collected from the above thermal equilibrium system for a building.

In order to achieve the above objects, the invention provides a thermal equilibrium system for a building, comprising: a first energy-recovery apparatus and a second energy-recovery apparatus. The first energy-recovery apparatus comprises: a first water storage tank; a foundation pile connected to a lower part of a structure of the building; a first heat-exchanging pipeline connected to the first water storage tank for performing heat exchange with the foundation pile, thereby heating water in the first heat-exchanging pipeline to a first temperature range; and a first pump disposed between the first water storage tank and the first heat-exchanging pipeline, and configured to pump the water in the first water storage tank to circulate the water between the first water storage tank and the first heat-exchanging pipeline. The second energy-recovery apparatus comprises: a second water storage tank, at least one first home appliance, wherein the at least one first home appliance generates first thermal energy during use; a second heat-exchanging pipeline connected to the second water storage tank for performing heat exchange with the at least one first home appliance to absorb the first thermal energy generated by the at least one first home appliance, thereby heating water in the second heat-exchanging pipeline to a second temperature range; and a second pump disposed between the second water storage tank and the second heat-exchanging pipeline, and configured to pump the water in the second water storage tank to circulate the water between the second water storage tank and the second heat-exchanging pipeline, wherein the second temperature range is broader than the first temperature range.

The invention also provides another aspect of a thermal equilibrium system, wherein the thermal equilibrium system as described above further comprises: a third pump and a fourth pump. The third pump connects to the first water storage tank and the second water storage tank, and is configured to pump water out of at least one of the first water storage tank and the second water storage tank to output the water to an indoor coiled pipe. The fourth pump connects to the first water storage tank and the second water storage tank, and is configured to pump water out of at least one of the first water storage tank and the second water storage tank to output the water to at least one second home appliance.

In order to achieve the above objects, the invention provides an aspect of an air-conditioning system, comprising: the thermal equilibrium system as described above and an air-handling unit. The air-handling unit comprises: an air intake capable of sucking an airflow from at least one of an external environment and an indoor space of the building; an air outtake capable of conveying the airflow to the indoor space of the building; a fan located between the air intake and the air outtake and capable of blowing the airflow from the air intake to the air outtake of the air-handling unit; a cooling coiled pipe positioned between the air intake and the air outtake for performing heat exchange with the airflow to cool the airflow, wherein the cooling coiled pipe is connected to a chilled water inlet pipe and a chilled water outlet pipe; and a heating coiled pipe which is positioned between the air intake and the air outtake, and is configured to perform heat exchange with the airflow to heat the airflow, wherein the heating coiled pipe is connected to a hot water inlet pipe and a hot water outlet pipe. The third pump of the above-mentioned thermal equilibrium system can pump water from the first water storage tank to convey the water to the cooling coiled pipe through a first auxiliary pipe connected to the chilled water inlet pipe; and the fourth pump of the above-mentioned thermal equilibrium system can pump water from the second water storage tank to convey the water to the heating coiled pipe through a second auxiliary pipe connected to the hot water inlet pipe.

In order to achieve the above objects, the invention provides another aspect of an air-conditioning system comprising the thermal equilibrium system and an air-handling unit. The air-handling unit comprises: an air intake capable of sucking an airflow from at least one of an external environment and an indoor space of the building; an air outtake capable of conveying the airflow to the indoor space of the building; a fan positioned between the air intake and the air outtake and used to blow the airflow from the air intake of the air-handling unit to the air outtake; a cooling coiled pipe positioned between the air intake and the air outtake, and configured to perform heat exchange with the airflow to cool the airflow, wherein the cooling coiled pipe is connected to a chilled water inlet pipe and a chilled water outlet pipe; a heating coiled pipe positioned between the air intake and the air outtake, and configured to perform heat exchange with the airflow to heat the airflow, wherein the heating coiled pipe is connected to a hot water inlet pipe and a hot water outlet pipe, and an auxiliary coiled pipe positioned after the air intake and before the cooling coiled pipe and the heating coiled pipe, and configured to perform heat exchange with the airflow to cool or to heat the airflow, wherein the auxiliary coiled pipe is connected to an auxiliary water inlet pipe and an auxiliary water outlet pipe, wherein the third pump of the thermal equilibrium system is able to pump water from the first water storage tank to the auxiliary water inlet pipe, to convey the water to the auxiliary coiled pipe; and the fourth pump of the thermal equilibrium system is able to pump water from the second water storage tank to the auxiliary water inlet pipe, to convey the water to the auxiliary coiled pipe.

DETAILED DESCRIPTION OF THE INVENTION

To clearly understand the features, contents, and advantageous technical effects of the invention, the invention is to be described in accompaniment with the drawings and preferred embodiments below. The drawings only serve to support the description and thus the interpretation of the claims of the invention should not be limited to the ratio and arrangement of the drawings.

The foundation piles as described below are preferable to be adopted in the construction of a building structure, such as an apartment, villa, dormitory, hotel, motel and so on. The foundation pile can also be adopted in the construction of a commercial building, factory, storage building, hospital, airport, station and other composite building structures. The term "building" in this description is not intended to be limited to "residential building," but can be extended to all building types with an available internal space for use.

Figure 1:
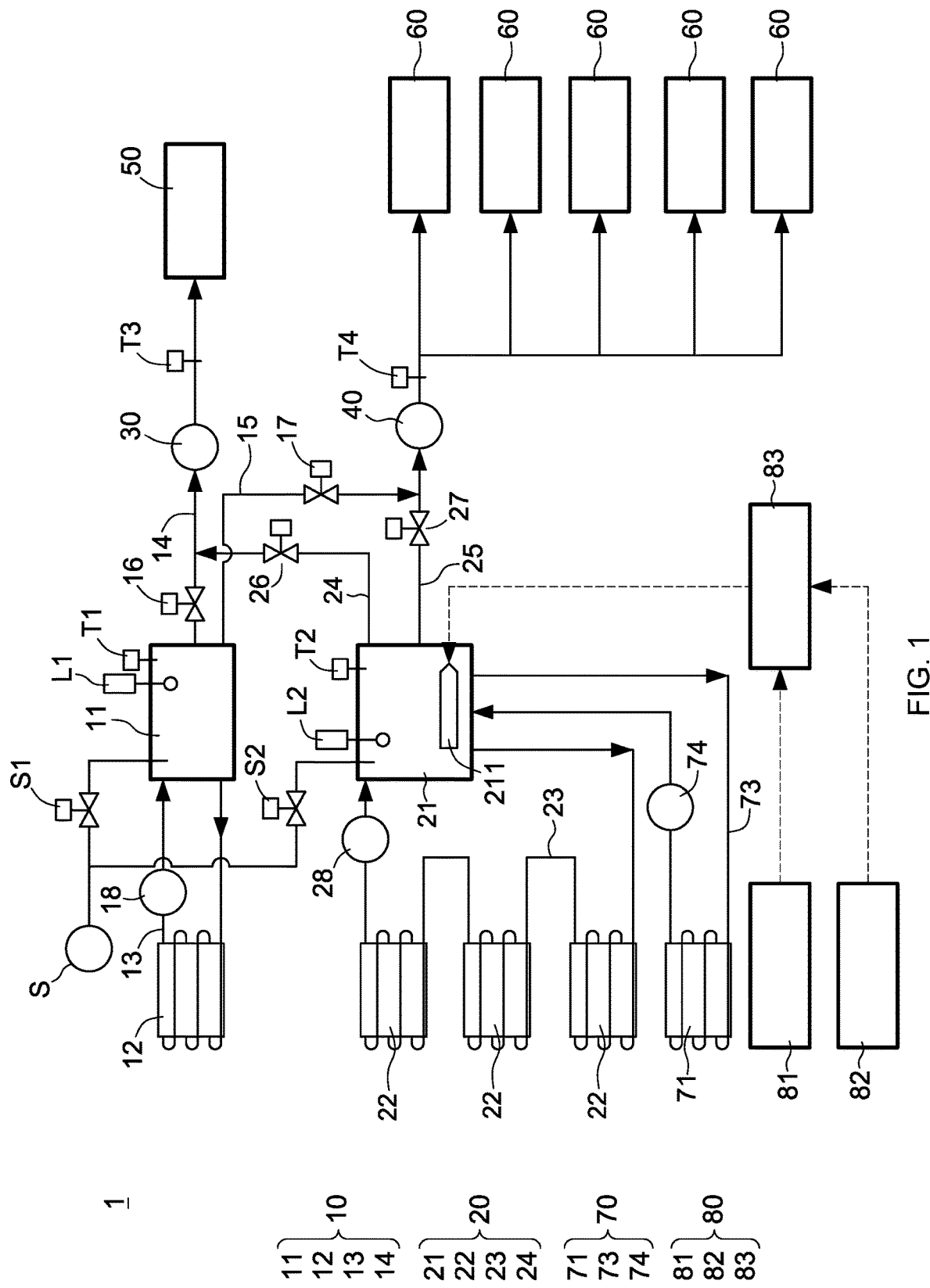
FIG. 1 illustrates an arrangement of a preferred embodiment of a thermal equilibrium system for a building.

FIG. 1 illustrates an arrangement of a preferred embodiment of a thermal equilibrium system for a building, wherein a thermal equilibrium system 1 at least comprises a first energy-recovery apparatus 10 and a second energy-recovery apparatus 20. The first energy-recovery apparatus 10 comprises a first water storage tank 11, a foundation pile 12 connected to a lower part of a building structure, a first heat-exchanging pipeline 13 and a first pump 18. The first heat-exchanging pipeline 13 is buried with or wound around the foundation pile to perform heat exchange. The temperature deep in the ground around the foundation pile under the building is relatively stable, and thus the temperature of the foundation pile 12 contacting the underground soil or rock is relatively constant. In this embodiment, by disposing the first pump 18 between the first water storage tank 11 and the first heat-exchanging pipeline 13, the water is pumped from the first water storage tank 11 and is circulated between the first water storage tank 11 and the first heat-exchanging pipeline 13 so that the water in the first heat-exchanging pipeline 13 is heat exchanged with the foundation pile 12 to heat the water in the first heat-exchanging pipeline 13 to a first temperature range and is then conveyed back to the first water storage tank 11. The temperature of the water in the first water storage tank 11 is therefore within the first temperature range. The first temperature range is preferably between 20 and 30 degrees Celsius, but not limited within the range. For instance, the constant temperature neighboring the foundation pile underground changes along with different latitudes where the building is located or seasons.

The second energy-recovery apparatus 20 comprises a second water storage tank 21, at least one first home appliance 22, second heat-exchanging pipeline 23, and a pump 28. The at least one first home appliance 22 can be, for example, one or more of a refrigerator, stove (including gas stove or electric stove) or heating oven, which generates first thermal energy or utilizable waste heat during use. The second heat-exchanging pipeline 23 is connected to the second water storage tank 21, and is also connected to the at least one first home appliance 22 to perform heat exchange by absorbing the first thermal energy or waste heat generated by the at least one first home appliance during use. The second pump 28, which is arranged between the second water storage tank 21 and the second heat-exchanging pipeline 23, serves to pump the water in the second water storage tank 21 to circulate the water between the second water storage tank 21 and the second heat-exchanging pipeline 23 so that the water in the second heat-exchanging pipeline 23 performs heat exchange with the at least one first home appliance 22 and is heated to a second temperature range. The second temperature range is preferably between 30 and 40 degrees Celsius, but is not limited within this range. For instance, based on the different numbers, types or waste heat amounts of the first home appliances, the temperature of the water heated by the second heat-exchanging pipeline 23 will also change.

As mentioned above, the thermal energy recycled by the first energy-recovery apparatus 10 and the second energy-recovery apparatus 20 heats the water in the first water storage tank 11 and in the second water storage tank 21 to the first temperature range and the second temperature range, respectively. The present embodiment also comprises a third pump 30 connected to the first water storage tank 11 and the second water storage tank 12 and serving to pump the water out of at least one of the first water storage tank 11 or the second water storage tank 12 for use. According to the embodiment shown in FIG. 1, the first water storage tank 11 is connected to the third pump 30 through a first pipeline 14, and the second water storage tank 21 is connected to third pump 30 through a second pipeline 24. It should be noted that the second pipeline 24 is connected to the third pump 30 by, for example, a pipe tee through the first pipeline 14. Besides, a first control valve 16 is disposed between the third pump 30 and the first water storage tank 11 according to FIG. 1. The first control valve 16 is disposed before the joint of the first pipeline 14 and the second pipeline 24 in FIG. 1 to control the output of the water for use from the first water storage tank 11 through the third pump 30. A second control valve 26 is disposed between the third pump 30 and the second water storage tank 21. The second control valve 26 is disposed at the second pipeline 24 before the joint of the first pipeline 14 and the second pipeline 24 to control the output of the water for use from the second water storage tank 21 through the third pump 30. With this pipeline structure described above, the user can pump the water out of the first water storage tank 11 or the second water storage tank 21 for use through the third pump 30 by the operation of the first control valve 16 or the second control valve 26. In operation, the user can also simultaneously switch on both the first control valve 16 and the second control valve 26 so that the water for use is outputted by the third pump 30 from both the first water storage tank 11 and second water storage 21.

The water pumped out of the first water storage tank 11 or the second water storage tank 21 by the third pump 30 can supply to, for example, an indoor coiled pipe of the building serving as an indoor ground cooling system (during summer) or ground warming system (during winter), and may also serve as an auxiliary water source for a chilled water type air-handling unit or hot water type air-handling unit. In the embodiment of FIG. 1, the water output by the third pump 30 supplies the indoor coiled pipe 50 for regulating the indoor temperature of the building.

In addition, the present embodiment further comprises a fourth pump 40 connected to first water storage tank 11 and the second water storage tank 21. The fourth pump 40 is configured to pump water out of at least one of the first water storage tank and the second water storage tank for use. In the embodiment of FIG. 1, the first water storage tank 11 is connected to the fourth pump 40 through a third pipeline 15 and the second water storage tank 21 is connected to the fourth pump 40 through a fourth pipeline 25. It should be noted that the third pipeline 15 is connected to the fourth pump 40 with, for example, a pipe tee through the fourth pipeline 25. Besides, a third control valve 17 is disposed between the fourth pump 40 and the first water storage tank 11. The third control valve 17 is disposed at the third pipeline 15 before the joint of the third pipeline 15 and the fourth pipeline 25 and serves to control the water output from the first water storage tank 11 through the fourth pump 40 for use. A fourth control valve 27 is disposed between the fourth pump 40 and the second water storage tank 21. The fourth control valve 27 is disposed at the fourth pipeline 25 before the joint of the third pipeline 15 and the fourth pipeline 25, and serves to control the water output from the second water storage tank 21 through the fourth pump 40 for use. With this pipeline structure, the user is able to output the water from the first water storage tank 11 or the second water storage tank 21 by the operation of the third control valve 17 or the fourth control valve 27. During operation, the user can also output the water from both the first water storage tank 11 and the second water storage 21 by simultaneously switching on both the third control valve 17 and the fourth control valve 27.

The water pumped out from the first water storage tank 11 or the second water storage tank 21 by the fourth pump 40 is able to be supplied to at least one second home appliance 60 of the building. The at least one home appliance 60 includes, for example, a water heater, thermos, washing machine, dishwasher and hot water bag. Utilizing the water with sufficient high temperature pumped out by the fourth pump 40 is able to directly reduce the thermal energy required for heating water from a certain low temperature to a higher temperature.

The embodiment in FIG. 1 further includes a third energy-recovery apparatus 70 comprising at least a third home appliance 71, a third heat-exchanging pipeline 73 and a fifth pump 74. The at least one third home appliance 71 could be an air-conditioning device which generates a second thermal energy during operation. The third heat-exchanging pipeline 73 is connected to the second water storage tank 21, and is also connected to the at least one third home appliance 71 so that the third heat-exchanging pipeline 73 is able to perform heat exchange with and absorb the second thermal energy generated by the third home appliance 71 during operation. The fifth pump 74 is disposed between the second water storage tank 21 and the third heat-exchanging pipeline 73, and is able to pump out the water from the second water storage tank 21 to circulate the water between the second water storage tank 21 and the third heat-exchanging pipeline 73 so as to absorb the second thermal energy generated by the at least one third home appliance 71 during operation, thereby heating the water in the third heat-exchanging pipeline 73 to a third temperature range. The third temperature range is close to the second temperature range or exceeds the upper limit of the second temperature range.

It should be noted that the thermal equilibrium system further includes a green energy apparatus 80 which can generate electrical power. The green energy apparatus connects to an electrical heating apparatus 211 in the second water storage tank 21 to heat the water in the second water storage tank 21. The green energy apparatus 80 can be, for example, a solar panel 81 mounted on the building, a micro wind turbine 82 and/or a relevant power collecting panel 83. The power source of the electrical heating apparatus 211 of the second water storage tank 21 is not limited to the electricity generated by the green energy apparatus 80 mentioned above, but can also connect to other power sources to cover the electricity deficit when the electricity generated by the green energy apparatus 80 is not enough for heating the water in the second water storage tank 21 to a specific temperature.

In light of the above contents, the water is pumped out of the first water storage tank 11 and the second water storage tank 21 by the third pump 30 or the fourth pump 40 for use. Hence, under some circumstances, the water in the first water storage tank 11 and the second water storage tank 21 may not be enough for other usage(s) due to the decreased volume of the water therein. In order to supply water to the first water storage tank 11 and the second water storage tank 21, the embodiment illustrated in FIG. 1 further includes an external water source S, a fifth control valve S1, and a sixth control valve S2. The external water source S is connected to both the first water storage tank 11 and the second water storage tank 21 to supply the water to the first water storage tank and the second water storage tank, among which the fifth control valve S1 controls the supply of the water from the external water source S to the first water storage tank 11, and the sixth control valve S2 controls the supply of the water from the external water source S to the second water storage tank 21.

In order to monitor and control the thermal equilibrium system 1 of FIG. 1, some sensors are arranged at water storage tanks or pipelines of the system 1 for providing the temperature in the pipelines and the water volume in the water storage tanks, and thereby different operation modes of the thermal equilibrium system for the building can be executed based on the information. The sensors mentioned above include a first temperature sensor T1 and a first liquid level sensor L1 disposed in the first water storage tank 11, a second temperature sensor T2 and a second liquid level sensor L2 disposed in the second water storage tank 21, a third temperature sensor T3 disposed at the water outlet pipe of the third pump 30 to measure the temperature of water output by the third pump, and a fourth temperature sensor T4 disposed at the water outlet pipe of the fourth pump 40 to measure the temperature of water output by the fourth pump 40. In other embodiments of the invention, the thermal equilibrium system 1 can further include the sensors disposed at the first heat-exchanging pipeline 13, the second heat-exchanging pipeline 23 and the external water source S to monitor the temperature of water in each pipeline of the thermal equilibrium system 1, and thus more detailed information of the system can be obtained.

The thermal equilibrium system illustrated in FIG. 1 of the invention has different operation modes. For instance, in regular mode, the water in the first water storage tank 11 of the first energy-recovery apparatus 10 reaches the first temperature range by the heat exchange between the first heat-exchanging pipeline 13 and the foundation pile 12, and is pumped by the third pump 30 directly to supply the indoor coiled pipeline 50 to serve as a ground cooling or warming system inside the building for use. At this time, the first control valve 16 is opened and the second control valve 26 is closed, and therefore the water in the second water storage tank 22 is not pumped out by the third pump 30. Similarly, the water in the second water storage tank 21 of the second energy-recovery apparatus 20 reaches the second temperature range by the heat exchange between the second heat-exchanging pipeline 23 and at least one home appliance 22, and is pumped by the fourth pump 40 directly to supply at least one second home appliance 60 for use. At this time, the fourth control valve 27 is opened and the third control valve 17 is closed, and therefore the water in the first water storage tank 11 is not pumped out by the fourth pump 40.

Figure 2:
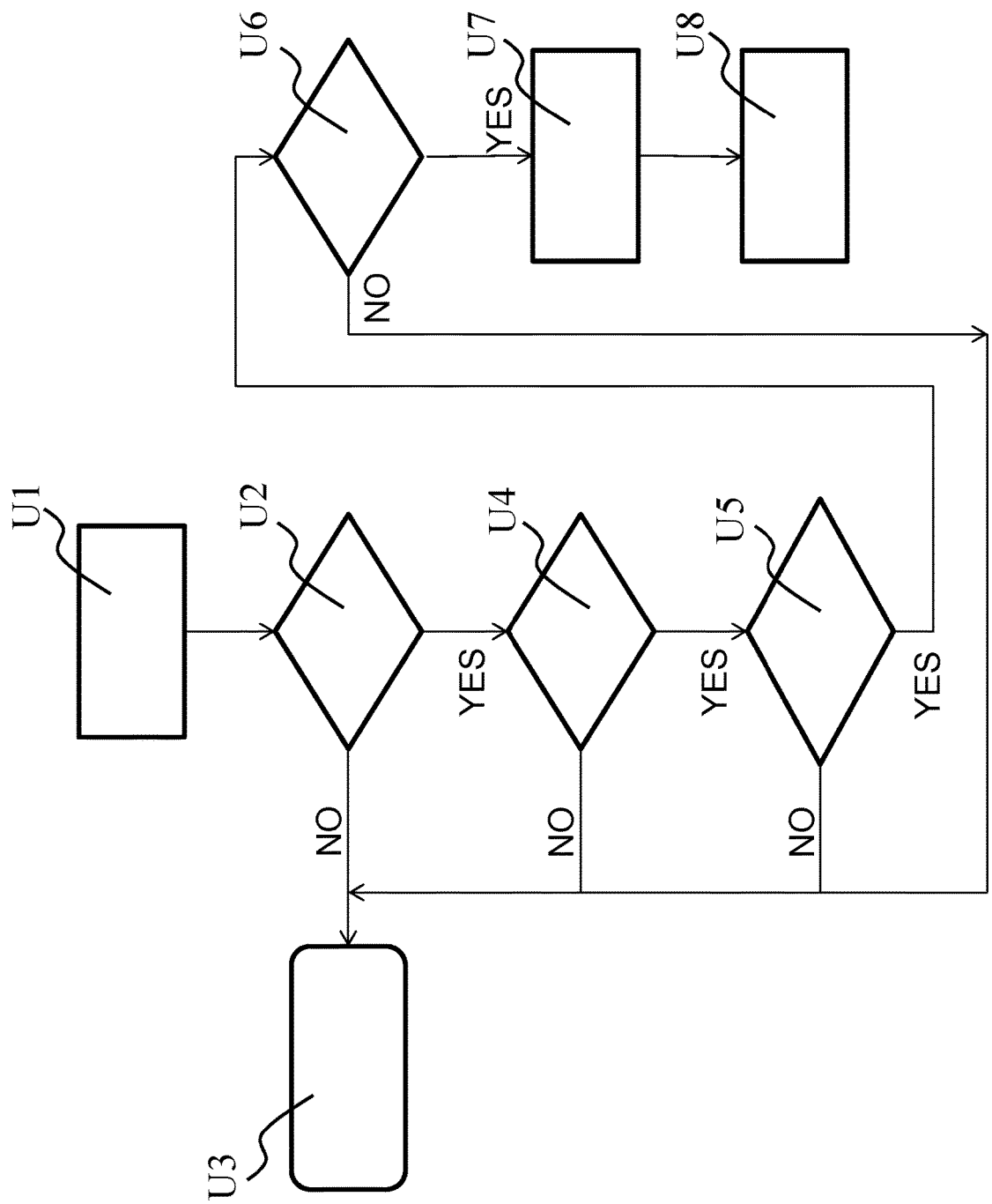
FIG. 2 illustrates an exemplary flowchart of the thermal equilibrium system for the building of FIG. 1.

However, under some circumstances, if the thermal energy recycled by the thermal equilibrium system 1 exceeds the required thermal energy, for an exemplary condition, the volume of the water recycled by the second energy-recovery apparatus 20 and having the second temperature range inside the second water storage tank 21 is sufficient to cover the water consumption of at least one second home appliance 60 (i.e., the water consumption of at least one second home appliance is not high), the water in the second water storage tank 21 is able to supply to the indoor coiled pipeline 50 through the third pump 30 by opening the second control valve 26. Referring to an exemplary flowchart in FIG. 2, in step U1, the thermal equilibrium system 1 starts up and is followed by step U2. In step U2, the system will determine whether the temperature of the water output by the fourth pump 40 and measured by the fourth temperature sensor T4 is higher than 30 degrees Celsius or not. If affirmative, then step U4 follows and the thermal equilibrium system will further determine whether the temperature of water measured by the second temperature sensor T2 in the second water storage tank 21 is higher than 30 degrees Celsius or not. If affirmative, then step U5 follows and the thermal equilibrium system will determine whether the liquid level of the second water storage tank 21 measured by the second liquid level sensor L2 is higher than the minimum allowed liquid level (such as 20%). If affirmative, such a condition means that the volume of water having a temperature within the second temperature range in the second water storage tank 21 is sufficient to cover the water consumption of at least one second home appliance. At this time, step U6 follows and the thermal equilibrium system will detect whether the user activates the ground warming mode (i.e., whether the third pump 30 is pumping water from the first water storage tank 11 to be supplied to the indoor coiled pipe 50). If affirmative, step U7 follows and the thermal equilibrium system will open the second control valve 26 and close the first control valve 16. Subsequently, step U8 follows and the system will pump water from the second water storage tank 21 instead so as to supply the indoor coiled pipe 50 for the execution of ground warming mode. Of course, as illustrated in FIG. 2, if any of the steps U2, U4, U5 and U6 is determined false, the system will enter step U3, and be maintained in regular mode, which means that each of the energy-recovery apparatuses will independently recycle and utilize thermal energy (i.e., the first water storage tank 11 of the first energy-recovery apparatus 10 supplies water to the indoor coiled pipe 50, and the second water storage tank 21 of the second energy-recovery apparatus 20 supplies water to the at least one second home appliance).

Figure 3:
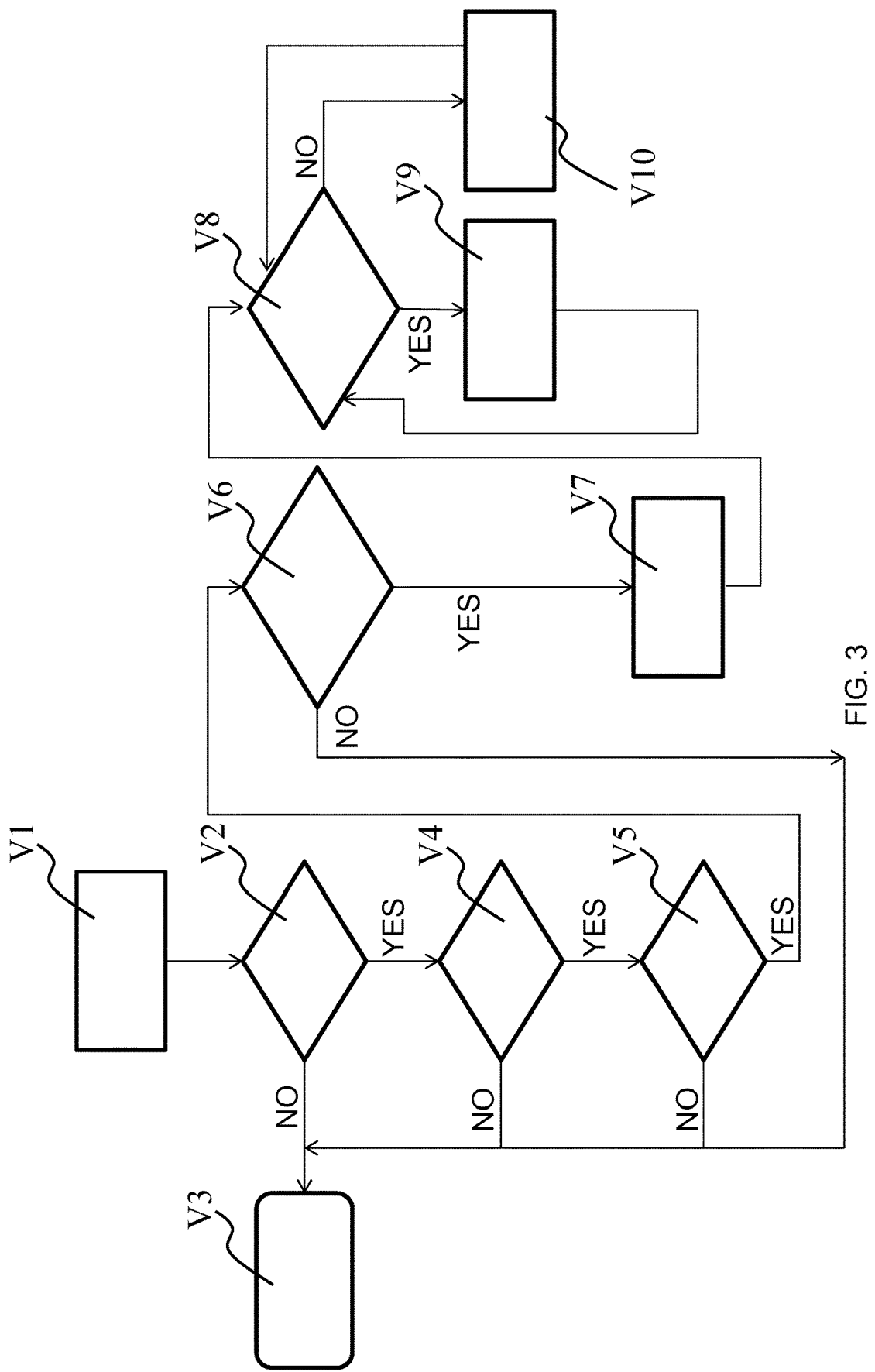
FIG. 3 illustrates another exemplary flowchart of the thermal equilibrium system for the building of FIG. 1.

Under some circumstances, the water consumption increases abruptly and thus causes the shortage of recycled thermal energy. For example, in the case that the volume of the water having the second temperature range recycled by the second energy-recovery apparatus 20 in the second water storage tank 21 is insufficient to be supplied to at least one second home appliance 60, the water in the first water storage tank 11 will supply at least one second home appliance 60 through the fourth pump 40 by opening the third control valve 17. For instance, according to the exemplary flowchart illustrated in FIG. 3, in step V1 the thermal equilibrium system will start up, and is followed by step V2. In step V2, the thermal equilibrium system will determine whether the liquid level of the second water storage tank 21 measured by the second liquid level sensor L2 is lower than the minimum allowed liquid level (such as 20%) or not. If affirmative, step V4 is followed, and the system will further determine whether the temperature of the water output by the fourth pump 40 and measured by the fourth temperature sensor T4 is lower than 30 degrees Celsius or not. At this time, if the measured temperature of the water is lower than 30 degrees Celsius, the system enters step V5. Subsequently, the system will further determine whether the temperature of the water measured by the first temperature sensor T1 in the first water storage tank 11 is higher than 25 degrees Celsius. If affirmative, step V6 then follows and the system will determine whether the liquid level of water in first water storage tank measured by the first liquid level sensor L1 is higher than the minimum allowed liquid level (such as 20%). If affirmative, it means that the liquid level of water in the first water storage tank 11 is higher than the minimum allowed liquid level, and then the system enters step V7. In step V7 the system will open the third control valve 17 to allow the fourth pump 40 to pump water from the first water storage tank 11 to increase the water supply to at least one second home appliance 60. Of course, as illustrated in FIG. 3, if any of the steps V4, V2, V4, V5 and V6 is determined false, the system will enter step V3 and the system will be maintained in regular mode, which means that each of the energy-recovery apparatuses will independently recycle and utilize thermal energy (i.e., the water of the first water storage tank 11 in the first energy-recovery apparatus 10 supplies the indoor coiled pipe 50, and the water of the second water storage tank 21 in the second energy-recovery apparatus 20 supplies the at least one second home appliance 60). However, in step V7, when the system allows the fourth pump 40 to pump the water from the first water storage tank 11 to increase the water supply to the at least one second home appliance 60, the water temperature of the mixed water decreases because the temperature of the water having the first temperature range in the first water storage tank 11 is lower than the temperature of the water having the second temperature range in the second water storage tank 21. At this time, the system will enter step V8 and the thermal equilibrium system 1 will further determine whether the temperature of the water measured by the second temperature sensor T2 in the second water storage tank 21 is lower than 35 degrees Celsius. If affirmative, the system will enter step V9 and the thermal equilibrium system 1 will further switch on the electrical heating apparatus 211 in the second water storage tank 21 to heat the water in the second water storage tank 21 to at least 35 degrees Celsius to increase the temperature of the water pumped by the fourth pump 40 and thus to further raise the temperature of the mixed water in the system. In contrast, if the determined outcome in step V8 is false, which means the temperature of the water in the second water storage tank 21 is still higher than 35 degrees Celsius, the system will enter step V10 and the thermal equilibrium system 1 will not switch on the electrical heating apparatus 211 to save energy. It should be noted that after performing step V9 or step V10, the system will return to step V8 after a certain interval of time to recheck whether the temperature of the water in the second water storage tank 21 is lower than 35 degrees Celsius as a feedback mechanism, so as to maintain the stability of the temperature of the suppled water in the whole system.

As mentioned above, the water pumped out by the third pump 30 from the first water storage tank 11 or the water pumped out by the fourth pump 40 from the second water storage tank 21 of the thermal equilibrium system 1 is able to be supplied to the indoor coiled pipe of the building to serve as a ground cooling system (during summer) or ground warming system (during winter). However, the water stored in the first water storage tank 11 and in the second water storage tank 21 of the thermal equilibrium system of the invention can also serve as an auxiliary water source for a conventional air-conditioning system of chilled water type or hot water type to reduce the water consumption of the chilled water or the hot water of the main system and to reduce energy consumption.

Figure 4:
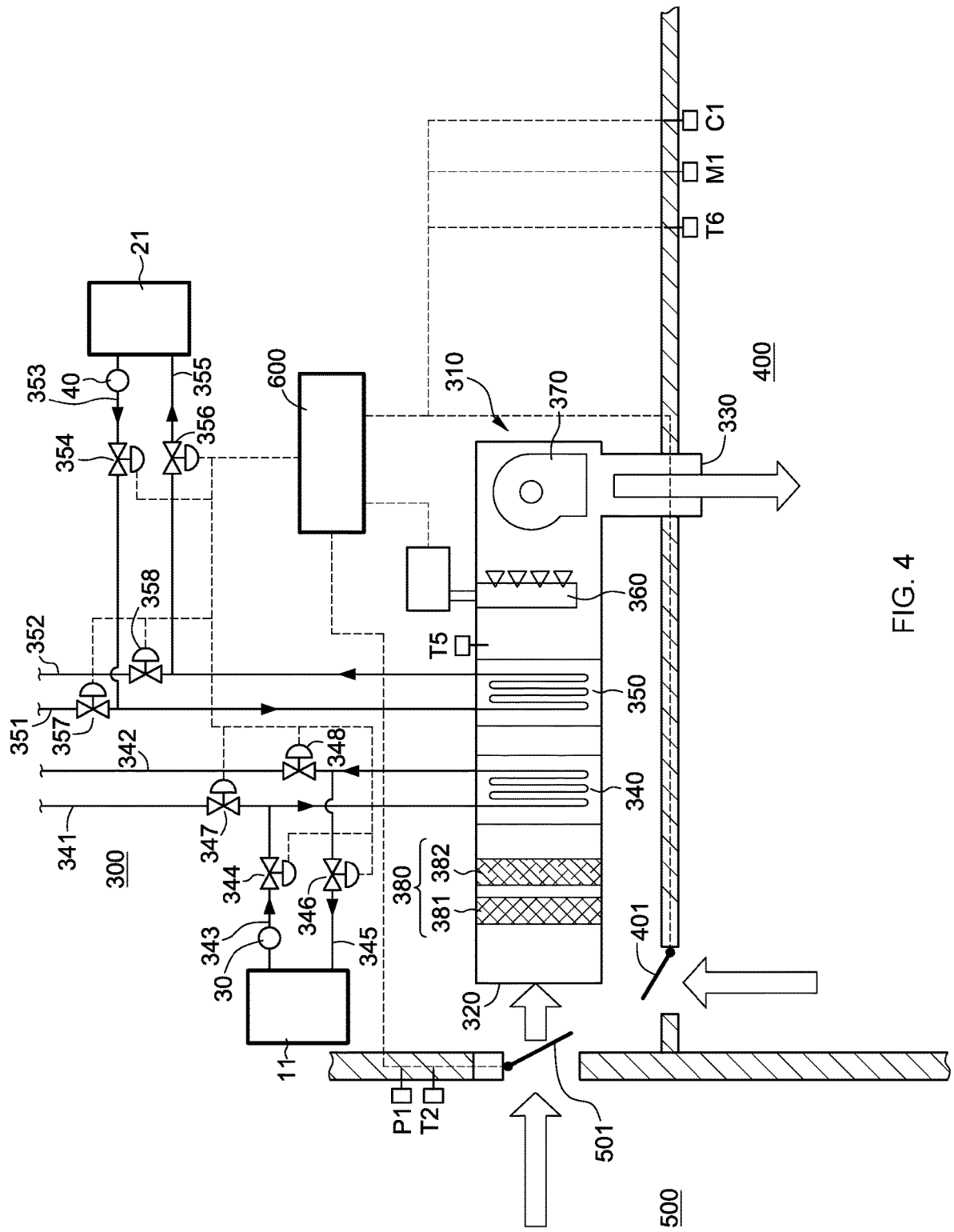
FIG. 4 illustrates an arrangement of a preferred embodiment of an air-conditioning system.

FIG. 4 illustrates an arrangement of a preferred embodiment of an air-conditioning system. It should be noted that for the sake of clarity and conciseness, FIG. 4 only illustrates the first water storage tank 11, the second water storage tank 12, the third pump 30 and the fourth pump 40, and does not illustrate the rest of the parts of the thermal equilibrium system.

In FIG. 4, the air-conditioning system 300 is usually disposed in an independent space between an indoor space 400 whose environment quality is to be controlled and an external environment 500 outside the building. For example, the space may be between the ceiling of the indoor space and the upper floor panel or similar space for arrangement of the air-conditioning system 300. The air-conditioning system 300 comprises an air-handling unit 310 having an air intake 320 and an air outtake 330, and further comprises a filter layer 380, a cooling coiled pipe 340 for cooling airflow, a heating coiled pipe 350 for heating airflow, a humidifier 360 for humidifying the airflow, and a fan 370 between the air intake 320 and the air outtake 330 arranged in sequence along a traverse direction between the air intake 320 and the air outtake 330 of the air-handling unit 310 illustrated in FIG. 4. The air intake 320 can suck an airflow from at least one of an external environment 500 or the indoor space 400, the air outtake 330 can output the airflow to the indoor space 400 of the building, and the fan 370 is located between the air intake 320 and the air outtake 330 and is used for conveying airflow from the air intake 320 to the air outtake 330 of the air-handling unit 310. In other words, when the fan 370 is activated, the airflow will enter the air-handling unit 310 through the air intake 320 from at least one of the external environment 500 or the indoor space 400, pass through the filter layer 380, the cooling coiled pipe 340, the heating coiled pipe 350 and the humidifier 360, and eventually enter the indoor space 400 through the air outtake 330. Of course, the position of the fan 370 is not limited to what is shown in FIG. 4. For instance, in an exemplary embodiment of the invention, the fan 370 is disposed between the filter 380 and the cooling coiled pipe 340. In addition, only one of the cooling coiled pipe 340 and heating coiled pipe 350 will work instead of both for either the cooling mode or the warming mode, and the positions of the cooling coiled pipe 340 and the heating coiled pipe 350 can be interchanged based on the requirements of the air-conditioner structure or pipeline arrangement. The filter layer 380 is not limited to one single layer filter, as multiple-layer filters can also be adopted to enhance the filtering of air filtration, such as a primary filter 381 and a secondary filter 382 illustrated in FIG. 4.

The preferred embodiment shown in FIG. 4 discloses that the air-conditioning system 300 comprises a return air damper 401 mounted or connected to an opening of the indoor space 400 and an external air damper 501 mounted or connected to another opening of the building in communication to the external space 500. When the fan 330 of the air-handling unit 310 is activated, the air intake 320 can suck air from at least one of the return air damper 401 or the external air damper 501 to form an airflow. With the structures of the return air damper 401 and the external air damper 501, the air-conditioning system 300 is able to suck air from the external environment 500 to the indoor space 400 for ventilation, to suck air from the indoor space 400 for air circulation, or to control the open degree of the openings of the return air damper 401 and the external air damper 501 separately by a controller 600 to adjust the mixing ratio of sucked air from the two openings.

The cooling coiled pipe 340 performs heat exchange with the airflow to cool down the airflow in cooling mode. In the present embodiment, the cooling coiled pipe 340 is connected to a chilled water inlet pipe 341 and a chilled water outlet pipe 342, wherein the chilled water inlet pipe 341 and the chilled water outlet pipe 342 are connected to a conventional main system capable of supplying chilled water to the cooling coiled pipe (not illustrated), and the chilled water inlet pipe 341 is further provided with a first auxiliary pipe 343 connected to the third pump 30 of the thermal equilibrium system for the building. The third pump 30 pumps water from the first water storage tank 11 to the cooling coiled pipe 340 through the first auxiliary pipe 343 of chilled water inlet pipe 341. The heating coiled pipe 350 performs heat exchange with the airflow to heat the airflow in the warming mode and is connected to a hot water inlet pipe 351 and a hot water outlet pipe 352, wherein the hot water inlet pipe 351 and the hot water outlet pipe 352 are connected to another conventional main system capable of supplying hot water to the heating coiled pipe (not illustrated), and the hot water inlet pipe 351 is further provided with a second auxiliary pipe 353 connected to the fourth pump 40 of the thermal equilibrium system. The fourth pump 40 pumps water from the second water storage tank 21 to the heating coiled pipe 350 through the second auxiliary pipe 353 of the hot water inlet pipe 351.

As illustrated in FIG. 4, the first auxiliary pipe 343 of the chilled water inlet pipe 341 connected to cooling coiled pipe 340 is provided with a seventh control valve 344 to control the volume of water entering the chilled water inlet pipe 341 from the first water storage tank 11 through the first auxiliary pipe 343. A third auxiliary pipe 345 can be further provided between the chilled water outlet pipe 342 and the first water storage tank 11 so that the water of the cooling coiled pipe 340 is able to be conveyed back to the first water storage tank 11 from the chilled water outlet pipe 342 through the third auxiliary pipe 345. The third auxiliary pipe 345 is provided with an eighth control valve 346 to control the volume of water conveyed back to the first water storage tank 11 from the chilled water outlet pipe 342 through the third auxiliary pipe 345.

In addition, the chilled water inlet pipe 341 is further provided with a ninth control valve 347 to control the main water intake supplied from the main system to the chilled water inlet pipe 341, and the first auxiliary pipe 343 is located between the ninth control valve 347 and the cooling coiled pipe 340. The chilled water outlet pipe 342 is further provided with a tenth control valve 348 to control the main water volume output from the chilled water outlet pipe 342, and the third auxiliary pipe 345 is located between the tenth control valve 348 and the cooling coiled pipe 340.

Similarly, the second auxiliary pipe 353 of the hot water inlet pipe 351 connected to the heating coiled pipe 350 is provided with an eleventh control valve 354 to control the volume of water conveyed to the hot water inlet pipe 351 from the second water storage tank 21 through the second auxiliary pipe 353. A fourth auxiliary pipe 355 is further provided between the hot water outlet pipe 352 and the second water storage tank 21 so that the water in the heating coiled pipe 350 is able to be convey back to the second water storage tank 21 from the hot water outlet pipe 352 through the fourth auxiliary pipe 355. The fourth auxiliary pipe 355 is provided with a twelfth control valve 356 to control the water volume conveyed back to the second water storage tank 21 from the hot water outlet pipe 352 through the fourth auxiliary pipe 355.

In addition, the hot water inlet pipe 351 is further provided with a thirteenth control valve 357 to control the main water intake supplied from the main system and conveyed to the hot water inlet pipe 351, and the second auxiliary pipe 353 is positioned between the thirteenth control valve 357 and the heating coiled pipe 350. The hot water outlet pipe 352 is further provided with a fourteenth control valve 358 to control the main water volume output from the hot water outlet pipe 352, and the fourth auxiliary pipe 355 is positioned between the fourteenth control valve 358 and the heating coiled pipe 350.

It should be noted that in order to control the quality of the air and environment of the indoor space, the air-conditioning system 300 is positioned in the air-handling unit 310, a temperature sensor T5 is preferably disposed in the air-handling unit 310 of the air-conditioning system 300 at a position behind the cooling coiled pipe 340 and the heating coiled pipe 350, so as to measure the temperature of airflow transferred in the air-handling unit 310 after performing heat exchange through the cooling coiled pipe 340 or the heating coiled pipe 350. In the indoor space 400, an indoor temperature sensor T6, an indoor humidity sensor M1 and an indoor $CO_2$ concentration sensor can be provided. In addition, at the external environment 500 of the building, an external environment temperature sensor T7 and a PM2.5 sensor P1 can be provided. Furthermore, all sensors illustrated in FIG. 4 are able to transmit signals to the controller 600, and the controller 600 is able to control the individual open degree of the return air damper 401, the external air damper 501, all the control valves illustrated in FIG. 4, and the actuation of the humidifier 360. By utilizing the sensors, the control valves and dampers having adjustable degrees of opening, and the controllable humidifier, etc., the control of the quality of the air and environment of the indoor space 400 can be achieved.

For instance, when the humidity of the indoor space measured by an indoor humidity sensor M1 is less than a predetermined humidity value, the controller 600 will activate the humidifier 360 to humidify the airflow in the air-handling unit until the humidity reaches the predetermined humidity value. In addition, due to the controllable open degree of the external air damper 501 and the return air damper 401, if the indoor $CO_2$ concentration sensor C1 detects that the $CO_2$ concentration of the indoor space 400 is greater than a predetermined $CO_2$ concentration value, the open degree of the external air damper 501 and the return air damper 401 can be individually controlled to adjust the mixing ratio of the air drawn from the external environment 500 and from the indoor space 400 to reach the predetermined $CO_2$ concentration value when the air-handling unit sucks in air. In an example of a cooling mode, if the external environment temperature measured by the external environment temperature sensor T7 is lower than a predetermined indoor temperature, the open degree of the external air damper 501 can be raised to increase the amount of air sucked from the external environment to adjust the temperature of the indoor space 400. However, if the value of PM2.5 of the external environment measured by the PM2.5 sensor P1 is greater than a predetermined value of PM2.5, the predetermined $CO_2$ concentration value of the indoor space 400 will serve as a standard value for the controller 600 to individually control the open degree of the external air damper 501 and the return air damper 401 so as to prevent too high of a concentration of PM2.5 suspended particulates from entering the indoor space 400 and negatively affecting the indoor air quality.

Figure 5:
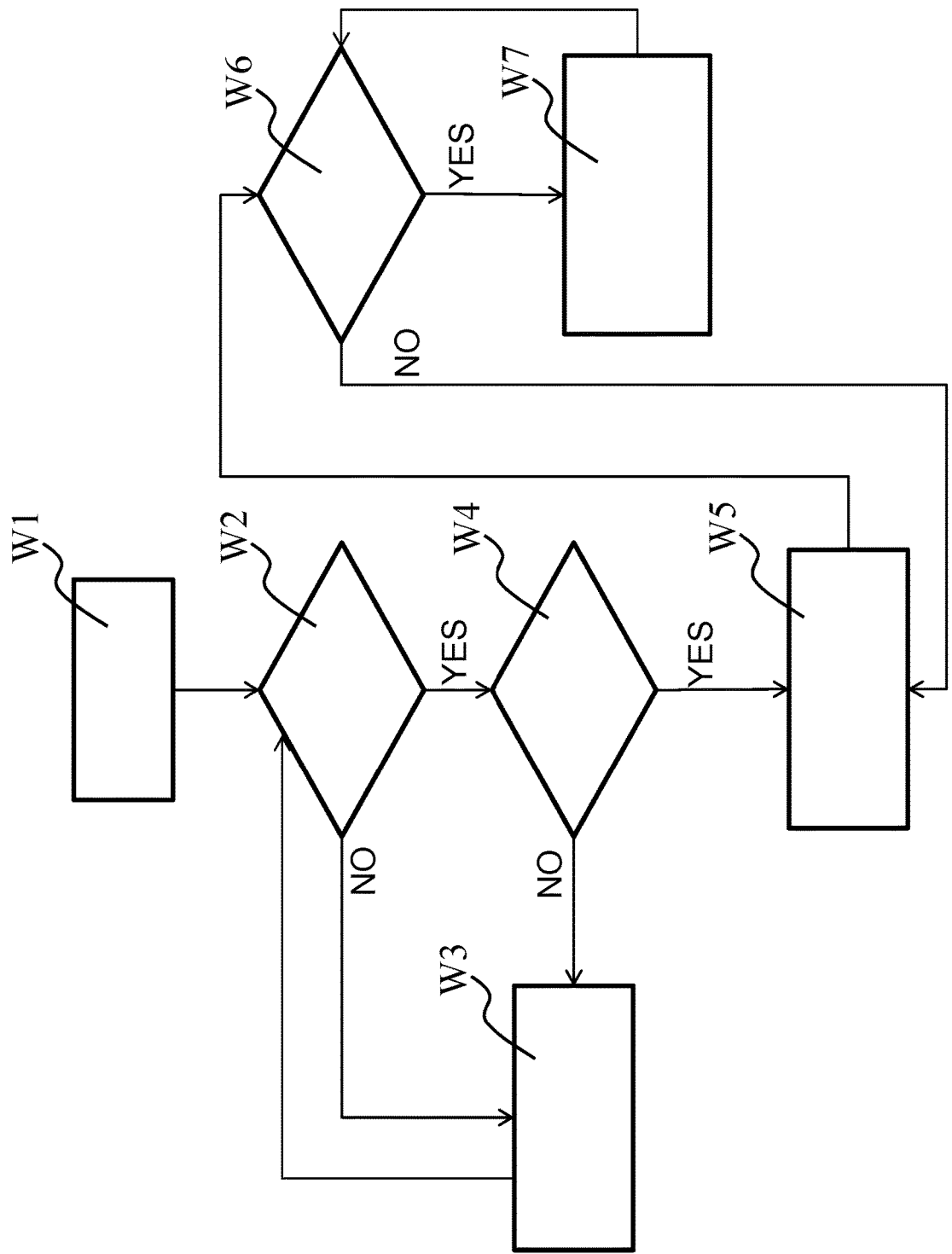
FIG. 5 illustrates an exemplary flowchart of a cooling mode of the air-conditioning system of FIG. 4.

The air-conditioning system 300 is able to run at least one of the cooling mode or warming mode. For instance, under the cooling mode, only the cooling coiled pipe 340 is working, and the heating coiled pipe 350 is not. Meanwhile, all of the eleventh control valve 354, the twelfth control valve 356, the thirteenth control valve 357 and the fourteenth control valve 358 will be closed. FIG. 5 illustrates the steps of an exemplary cooling mode. In step W1, the air-conditioning system 300 starts up and the controller 600 opens the ninth control valve 347 of the chilled water inlet pipe 341 and the tenth control valve 348 of the chilled water outlet pipe 342 to allow the chilled water of the main system to run through the cooling coiled pipe 340, and to perform heat exchange with the airflow in the air-handling unit to cool it down so that the airflow can then be transferred to the indoor space 400. In step W2, after the airflow performs heat exchange with the cooling coiled pipe 340, the temperature sensor T5 in the air-handling unit 310 will measure the temperature of the airflow after cooling down and determine whether the temperature is lower than or equal to a predetermined airflow temperature. If false, step W3 follows to maintain the use of the chilled water provided from the main system to run through the cooling coiled pipe to continue cooling down the airflow in the air-handling unit 310, and then returns to step W2 until the outcome of step W2 is determined affirmative. Once the outcome of step W2 is affirmative, then step W4 follows to check whether the open degree of the ninth control valve 347 of the chilled water inlet pipe 341 and the tenth control valve 348 of the chilled water outlet pipe 342 are lower or equal to 20%. If the outcome is false, it means that the heat load of the indoor space 400 is still in a high load state, and then returns to step W3 which keeps the use of the chilled water from the main system to run through the cooling coiled pipe 340 to cool down the airflow in the air-handling unit 310. If the outcome is affirmative, it means that the heat load of the indoor space 400 is in a low load state, and then step W5 follows. In Step 5, the controller 600 will open the seventh control valve 344 of the first auxiliary pipe 343 and the eighth control valve 346 of the third auxiliary pipe 345 to allow the third pump 30 to pump water from the first water storage tank 11 of the thermal equilibrium system as an auxiliary water source running through the first auxiliary pipe 343 to mix with the chilled water output by the chilled water inlet pipe 341 from the main system, and then the mixed water is supplied to the cooling coiled pipe 340. In step W5, the auxiliary water source is used so that the energy consumption of the main system is reduced. Subsequently, in step W6, the temperature sensor T5 will detect the temperature of the airflow after the auxiliary water source is used to proceed with the cooling in step W5, so as to determine if it is higher than the predetermined temperature. If the determined outcome is false, it means that the temperature of the airflow is lower than or remains the same as the predetermined temperature, and the system will return to step W5 which keeps utilizing the auxiliary water source of the first water storage tank 11 to maintain the mixing ratio of the chilled water of the main system and the auxiliary water source for saving energy and cooling down the airflow. If the determined outcome is affirmative, it means that the temperature of the airflow transferred by the air-handling unit 310 is higher than the predetermined temperature, and step W7 follows. In step W7, the degrees of opening of the seventh control valve 344 of the first auxiliary pipe 343 and the eighth control valve 346 of the third auxiliary pipe 345 will be individually adjusted to change the mixing ratio of the water from the auxiliary water source and from the chilled water of the main system, or will be directly closed to stop conveying the water from the auxiliary water source but only utilize the chilled water of the main system to supply water to the cooling coiled pipe 340. Subsequently, step W6 is performed to again determine whether the temperature of airflow detected by the temperature sensor T5 is higher than the predetermined temperature or not. With the above feedback control, the ratio of water from the auxiliary water source of the first water storage tank 11 and the chilled water from the main system can be optimized to achieve the goal of energy saving.

Figure 6:
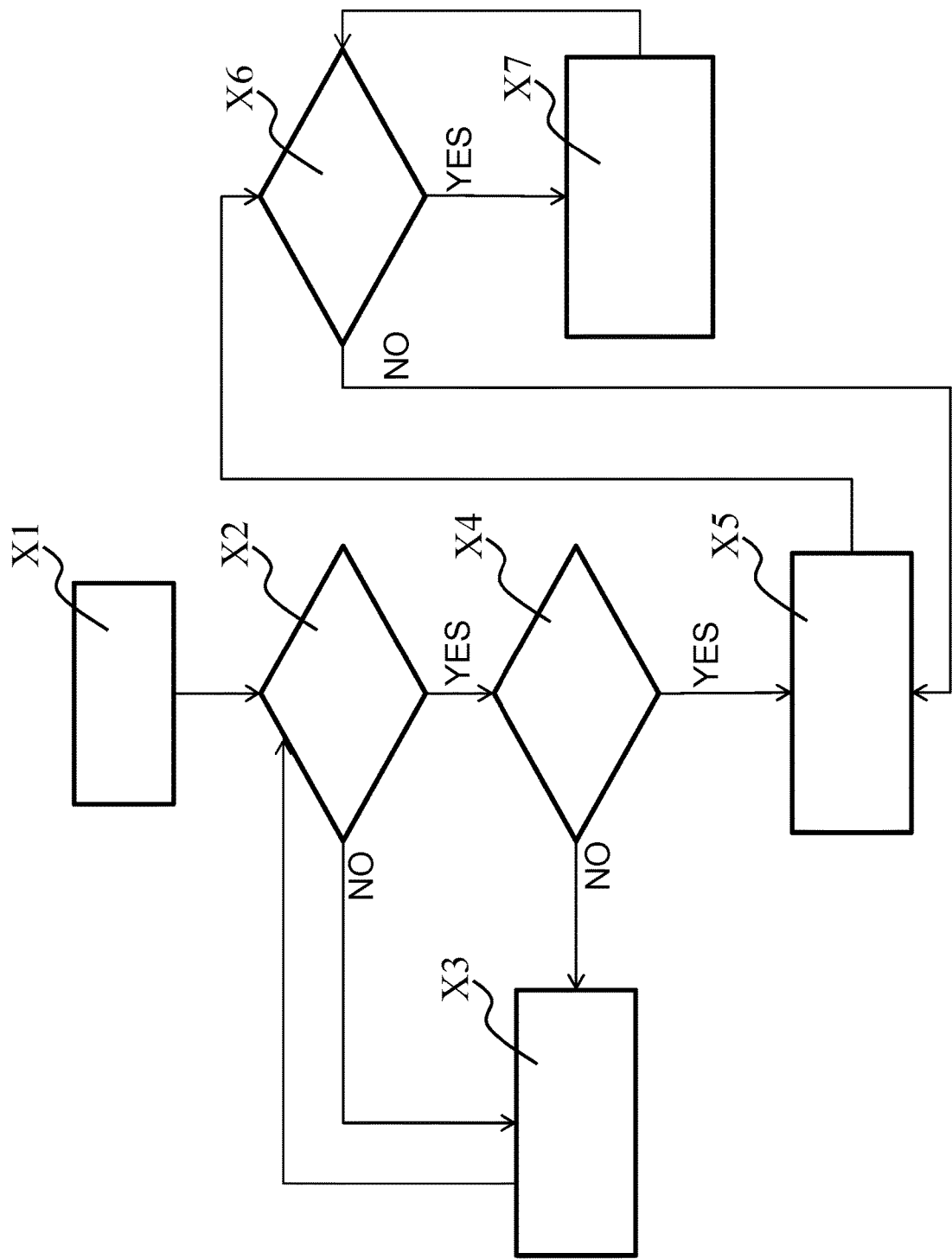
FIG. 6 illustrates an exemplary flowchart of a warming mode of the air-conditioning system of FIG. 4.

Similarly, if the air-conditioning system 300 is under warming mode, only the heating coiled pipe 350 is working and the cooling coiled pipe 340 is not. Meanwhile, the seventh control valve 344, the eighth control valve 346, the ninth control valve 347 and the tenth control valve 348 are closed. FIG. 6 illustrates the steps of an exemplary warming mode. In step X1, the air-conditioning system 300 starts up and the controller 600 opens the thirteenth control valve 357 of the hot water inlet pipe 351 and the fourteenth control valve 358 of the hot water outlet pipe 352 to allow the hot water of the main system to run through the heating coiled pipe 350, and to perform heat exchange with the airflow in the air-handling unit 310 to heat it up, so the airflow can be transferred to the indoor space 400. In step X2, after the airflow performs heat exchange with the heating coiled pipe 350, the temperature sensor T5 in the air-handling unit 310 will measure the temperature of airflow after heating and determine whether the airflow temperature is lower than or equal to a predetermined airflow temperature. If false, the system will proceed with X3 to keep using the hot water from the main system to run through the heating coiled pipe 350 to heat up the airflow in the air-handling unit 310, and then step X2 will follow again until the outcome of X2 is affirmative. If the determined outcome of step X2 is affirmative, the system will proceed with step X4. In step X4, the system will check whether the open degree of the thirteenth control valve 357 of the hot water inlet pipe 351 and the fourteenth control valve 358 of the hot water outlet pipe 352 is lower than or equal to 20%. If the determined outcome is false, it means that the cold load of the indoor space 400 is still in high load state, and the system will return to step X3 in which the system will keep using the hot water from the main system to run through the heating coiled pipe 350 to heat up the airflow in air-handling unit 310. However, if the outcome is affirmative, it means that the cold load of indoor space 400 is in a low load state, and the system will proceed with step X5. At this time, the controller 600 will open the eleventh control valve 354 of the second auxiliary pipe 353 and the twelfth control valve 356 of the fourth auxiliary pipe 355 to allow the fourth pump 40 to pump water from the second water storage tank 21 of the thermal equilibrium system as an auxiliary water source so that the water of the auxiliary water source is able to run through the second auxiliary pipe 343 and then to mix with the hot water running in the hot water inlet pipe 351 from the main system and eventually be supplied to the heating coiled pipe. In step X5, the auxiliary water source is used to decrease the energy consumption of the main system. Subsequently, in step X6, after the system starts to use the auxiliary water source to save energy and to heat the airflow (as described in step X5), the temperature of airflow output by the air-handling unit will be measured by the temperature sensor T5 and the system will determine whether the measured temperature is higher than the predetermined temperature. If the determined outcome is false, it means that the airflow temperature is higher than or the same as the predetermined temperature, and the system will then return to step X5 to keep utilizing the auxiliary water source from the second water storage tank 21 and maintaining the mixing ratio of the water from the auxiliary water source and hot water from the main system to save energy and to heat up the airflow. If the determined outcome is affirmative, it means that the temperature of the airflow transferred by the air-handling unit 310 is lower than the predetermined temperature, and the system will proceed with step X7. In step X7, the system will adjust the degrees of opening of the eleventh control valve 354 of the second auxiliary pipe 353 and the twelfth control valve 356 of the fourth auxiliary pipe 355 individually to change the mixing ratio of the water from the auxiliary source and hot water of the main system, or will directly close the eleventh control valve 354 of the second auxiliary pipe 353 and the twelfth control valve 356 of the fourth auxiliary pipe 355 to stop transferring the water from the auxiliary water source but only utilize the hot water of the main system to supply water to the heating coiled pipe 350. The system will then return to step X6 to again determine whether the temperature of the airflow detected by the temperature sensor T5 is lower than the predetermined temperature. With the above feedback control, the mixing ratio of the water from the auxiliary water source of the second water storage tank 21 and hot water from the main system can be optimized to achieve the goal of energy saving.

Figure 7:
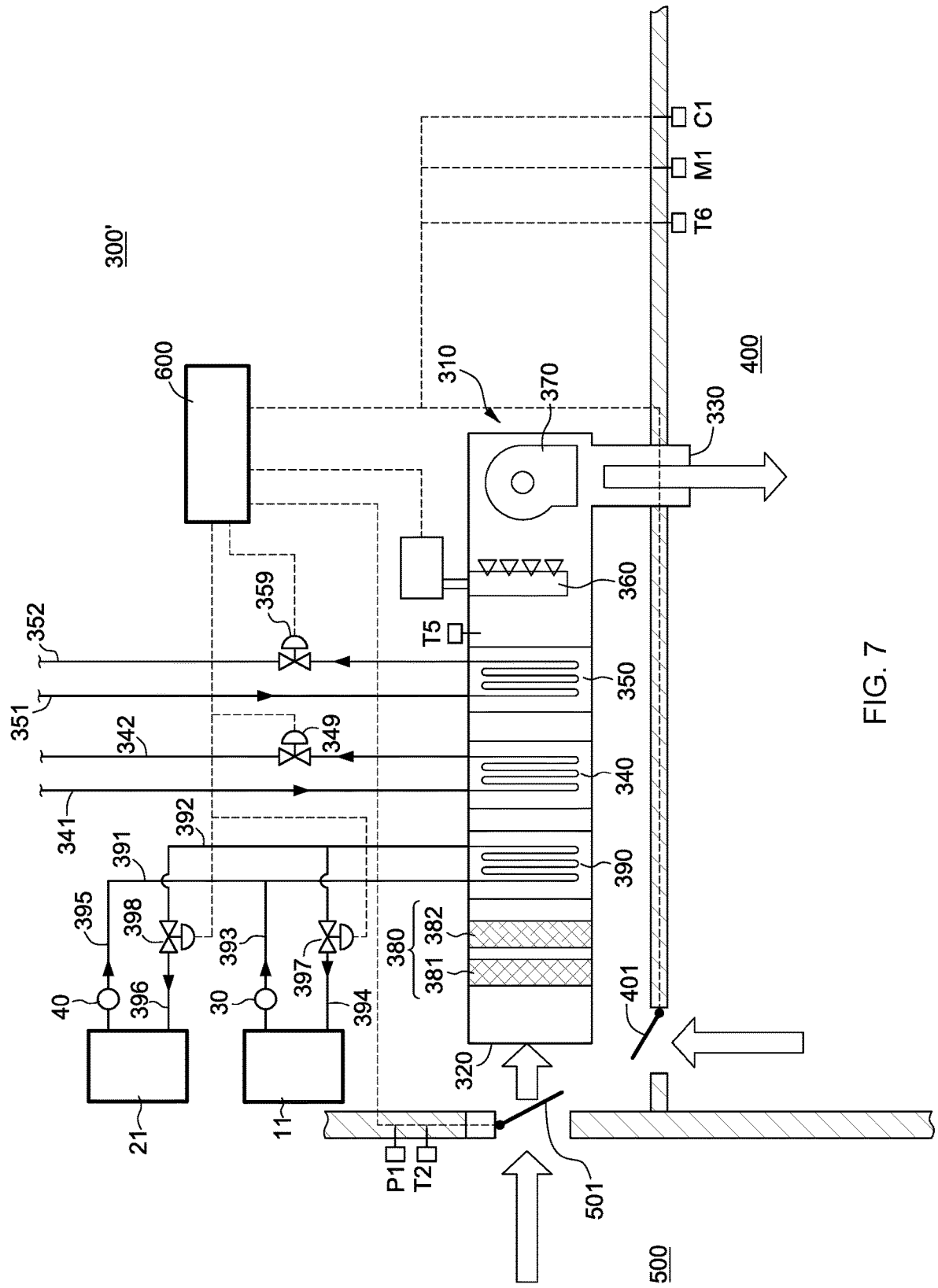
FIG. 7 illustrates an arrangement of another preferred embodiment of an air-conditioning system.

FIG. 7 illustrates a structure of another embodiment of the air-conditioning system of the invention. Most of the structures illustrated in FIG. 7 are similar to the structures in FIG. 4. It should be noted that for the sake of clarity and conciseness, FIG. 7 only illustrates the first water storage tank 11, the second water storage tank 12, the third pump 30 and the fourth pump 40, but omits the rest of the parts of the thermal equilibrium system for the building.

In FIG. 7, the air-conditioning system 300' is usually arranged in a space independent from and between the indoor space 400 and the external environment 500 outside the building. The air-conditioning system 300' is provided with an air-handling unit 310' having an air intake 320 and an air outtake 330. Referring to FIG. 7, the air-handling unit 310' further comprises a filter layer 380, an auxiliary coiled pipe 390 for pre-cooling or pre-heating the airflow, a cooling coiled pipe 340 for cooling an airflow, a heating coiled pipe 350 for heating the airflow, a humidifier 360 for humidify the airflow, and a fan 370 arranged in a traverse direction in sequence between the air intake 320 and the air outtake 330. As mentioned above, the airflow enters the air intake 320 from at least one of an external environment 500 and the indoor space 400, and is outputted from the air outtake 330 to the indoor space 400 of the building. The fan 370 is located between the air intake 320 and air outtake 330 and is able to convey the airflow from the air intake 320 to the air outtake 330 of the air-handling unit 310'. When the fan 370 is activated, the airflow enters the air-handling unit 310' through the air intake 320 from at least one of the external environment 500 and the indoor space 400, and then runs through the filter layer 380, the auxiliary coiled pipe 390, the cooling coiled pipe 340, the heating coiled pipe 350 and the humidifier 360, and eventually enters the indoor space 400 from the air outtake 330 by the fan 370 for conveying the air flow. The position of the fan 370 is not limited to what is illustrated in FIG. 7. For instance, in an embodiment of the invention, the fan 370 is disposed between the filter 380 and the auxiliary coiled pipe 390. In addition, the positions of the cooling coiled pipe 340 and the heating coiled pipe 350 can be interchanged based on the requirements of the structure or pipeline arrangement. The filter layer 380 is not limited to one single layer filter, and multiple-layer filters can also be adopted to enhance the effect of air filtration, such as the primary filter 381 and the secondary filter 382 illustrated in FIG. 7.

In the preferred embodiment illustrated in FIG. 7, the air-conditioning system 300' is provided with a return air damper 401 mounted or connected to the opening of the indoor space 400 and an external air damper 501 mounted or connected to another opening of the building in communication with the external space 500. When the fan 370 of the air-handling unit 310' is activated, air flow is sucked from at least one of the return air damper 401 and the external air damper 501 to formulate airflow into the air intake 320. By utilizing the structures of the return air damper 401 and the external air damper 501, the air-conditioning system 300' is able to either suck air from the external environment 500 to the indoor space 400 for ventilation or suck air from the indoor space 400 for air circulation, and to control the degrees of opening of the return air damper 401 and the external air damper 501 with a controller 600 to adjust the mixing ratio of sucked air.

The auxiliary coiled pipe 390 in FIG. 7 is for pre-cooling or pre-heating of the airflow in the air-handling unit 310' in a cooling mode or warming mode. The auxiliary coiled pipe 390 is connected to an auxiliary inlet pipe 391 and an auxiliary outlet pipe 392, among which a fifth auxiliary pipe 393 is provided between the first water storage tank 11 and the auxiliary inlet pipe 391, and a sixth auxiliary pipe 394 is provided between the first water storage tank 11 and the auxiliary outlet pipe 392. With this structure, the water in the first water storage tank can be pumped by the third pump 30, enters the auxiliary inlet pipe 391 through the fifth auxiliary pipe 393, then enters the auxiliary coiled pipe 390, and finally runs back to the first water storage tank through the auxiliary outlet pipe 392 and the sixth auxiliary pipe 394. One of the fifth auxiliary pipe 393 and the sixth auxiliary pipe 394 is provided with a fifteenth control valve 397 to control the water volume entering the auxiliary inlet pipe 391 from the first water storage tank 11 so as to control the pre-cooling of the airflow in the air-handling unit 310' by the auxiliary coiled pipe 390.

The cooling coiled pipe 340 illustrated in FIG. 7 performs heat exchange with the airflow to cool it down in cooling mode. The cooling coiled pipe 340 is connected to a chilled water inlet pipe 341 and a chilled water outlet pipe 342. In the present embodiment, the chilled water inlet pipe 341 and the chilled water outlet pipe 342 are mainly connected to a conventional main system (not illustrated) capable of supplying chilled water to run through the cooling coiled pipe. In addition, one of the chilled water inlet pipe 341 and the chilled water outlet pipe 342 is provided with a sixteenth control valve 349 to control the water volume conveyed to the chilled water inlet pipe 341 from the main system.

In addition, in FIG. 7, a seventh auxiliary pipe 395 is provided between the second water storage tank 21 and the auxiliary inlet pipe 391, and an eighth auxiliary pipe 396 is provided between the second water storage tank 21 and the auxiliary outlet pipe 392. With this structure, the water in the second water storage tank can be pumped by the fourth pump 40 to enter the auxiliary inlet pipe 391 through the seventh auxiliary pipe 395, and then to enter the auxiliary coiled pipe 390, and finally to go back to the second water storage tank through the auxiliary outlet pipe 392 and the eighth auxiliary pipe 396. One of the seventh auxiliary pipe 395 and the eighth auxiliary pipe 396 is provided with a seventeenth control valve 398 to control the water volume that enters the auxiliary inlet pipe 391 from the second water storage tank 21 to control the pre-heating level of the airflow in the air-handling unit 310' conveyed through the auxiliary coiled pipe 390.

Furthermore, the heating coiled pipe 350 in FIG. 7 performs heat exchange with the airflow to heat it up in warming mode. The heating coiled pipe 350 is connected to a hot water inlet pipe 351 and a hot water outlet pipe 352. The hot water inlet pipe 351 and the hot water outlet pipe 352 are mainly connected to a conventional main system (not illustrated) for supplying hot water to the heating coiled pipe, and one of the hot water inlet pipe 351 and the hot water out let pipe 352 is provided with an eighteenth control valve 349 to control the volume of hot water transferred to the hot water inlet pipe 351 from the main system.

As illustrated in FIG. 7, in order to achieve the control of the air quality of the indoor air space or the indoor environment, an air-conditioning system 300' is also arranged in the air-handling unit 310', and a temperature sensor T5 is preferably disposed behind the cooling coiled pipe 340 and the heating coiled pipe 350 to measure the temperature of airflow after the airflow runs through the cooling coiled pipe 340 or the heating coiled pipe 350 for heat exchange. In the indoor space 400, an indoor temperature sensor T6, an indoor humidity sensor M1 and an indoor $CO_2$ concentration sensor C1 can be provided. In addition, at the external environment 500 outside, an external environment temperature sensor T7 and a PM2.5 sensor P1 can also be provided. Furthermore, all of the sensors are able to transmit signals to the controller 600 illustrated in FIG. 7. Also, the degrees of opening of the return air damper 401, the external air damper 501, and all the control valves illustrated in of FIG. 7, together with the activation of the humidifier 360 of the air-handling unit 310', can be individually adjusted or controlled by the controller 600. By using the above-mentioned sensors, control valves and damper structures with adjustable degrees of opening, controllable humidifier, etc., the goals of controlling the air or environment quality of the indoor space 400 can be achieved.

For instance, when the humidity of the indoor space measured by the indoor humidity sensor M1 is less than a predetermined humidity value, the controller 600 will activate the humidifier 360 to humidify the airflow in the air-handling unit until the measured humidity reaches the predetermined humidity value. In addition, due to controllable degrees of opening of the external air damper 501 and the return air damper 401, when the $CO_2$ concentration of the indoor space 400 detected by the indoor $CO_2$ concentration sensor C1 is greater than a predetermined $CO_2$ concentration value, the system will control the degrees of opening of the external air damper 501 and the return air damper individually to adjust the mixing ratio of the air sucked into the air-handling unit 310' from the external environment 500 and from the indoor space, so that the predetermined $CO_2$ concentration value can be reached. In addition, if the value of PM2.5 of the external environment measured by the PM2.5 sensor P1 is greater than a predetermined value of PM2.5, the predetermined $CO_2$ concentration value of the indoor space 400 will serve as a standard value as reference for the controller 600 to control the degrees of opening of the external air damper 501 and the return air damper 401 individually to prevent too high of a concentration of PM2.5 suspended particulates from being introduced into the indoor space 400 and negatively affecting the indoor air quality.

The air-conditioning system 300' can also be operated under cooling mode or warming room mode. If the system operates under cooling mode, only the auxiliary coiled pipe 390 and the cooling coiled pipe 340 will work and the heating coiled pipe 350 will not. Therefore, both the seventeenth control valve 398 and the eighteenth control valve 359 are closed. Under an operation condition of the cooling mode, the temperature sensor T5 of the air-handling unit 310' will measure the temperature of airflow output by air conditioning box 310'. If the temperature measured by temperature sensor T5 reaches the predetermined airflow temperature, the controller 600 will open the fifteenth control valve 397 to allow the third pump 30 of the thermal equilibrium system to pump water from the first water storage tank 11 to supply water to the auxiliary coiled pipe 390 through the auxiliary inlet pipe 391, so as to pre-cool the airflow in the air-handling unit 310', and to reduce the degrees of opening of the sixteenth control valve 349 to decrease the water volume entering the cooling coiled pipe 340 through the chilled water inlet pipe 341 to achieve the goal of saving energy consumption. Besides, if the temperature of the airflow measured by the temperature sensor T5 is maintained at the predetermined airflow temperature, the controller will individually maintain the degrees of opening of the fifteenth control valve 397 and the sixteenth control valve 349. However, if the temperature of airflow measured by the temperature sensor T5 fails to be maintained at the predetermined airflow temperature, the controller 600 will adjust the degrees of opening of the fifteenth control valve 397 and the sixteenth control valve 349 individually in order to adjust water volume entering the auxiliary coiled pipe 390 from the first water storage tank 11 and the water volume entering the cooling coiled pipe 340 from the main system through the chilled water inlet pipe 341 until the temperature of airflow measured by the temperature sensor reaches the predetermined airflow temperature. With the above-mentioned cooling mode mentioned above, the thermal energy recycled by thermal equilibrium system can be effectively utilized and the energy consumption of the main system can be reduced.

If the system operates under warming mode, the air-conditioning system 300' will only activate the auxiliary coiled pipe 390 and the heating coiled pipe 350, while the cooling coiled pipe 340 will not be activated and both the fifteenth control valve 397 and the sixteenth control valve 349 will be closed. Under an operation condition of the warming mode, the temperature sensor T5 of the air-handling unit 310' will measure the temperature of airflow output by the air-handling unit 310'. If the temperature measured by the temperature sensor T5 reaches the predetermined airflow temperature, the controller 600 will open the seventeenth control valve 398 to make the fourth pump 40 of the thermal equilibrium system to pump water from the second water storage tank 21 to supply water to the auxiliary coiled pipe 390 through the auxiliary inlet pipe 391, and to pre-heat the airflow running through the air-handling unit 310', so as to reduce the degrees of opening of the eighteenth control valve 359 to decrease the water volume entering the heating coiled pipe 350 through the hot water inlet pipe 351 to save energy consumption. Besides, if the temperature of airflow measured by the temperature sensor T5 is maintained at the predetermined airflow temperature, the controller will maintain the degrees of opening of the seventeenth control valve 398 and the eighteenth control valve 359 individually. If the temperature of the airflow measured by the temperature sensor T5 fails to be maintained at the predetermined airflow temperature, the controller 600 will adjust the degrees of opening of the seventeenth control valve 398 and the eighteenth control valve 359 individually in order to adjust the water volume entering the auxiliary coiled pipe 390 from the second water storage tank 21 and the water volume entering the heating coiled pipe 350 through the hot water inlet pipe 351 from the main system, until the temperature of airflow measured by the temperature sensor reaches the predetermined airflow temperature. With the above-mentioned operation mode, the thermal energy recycled by the thermal equilibrium system can be effectively utilized and the energy consumption of the main air-conditioning system can be reduced.

Figure 8:
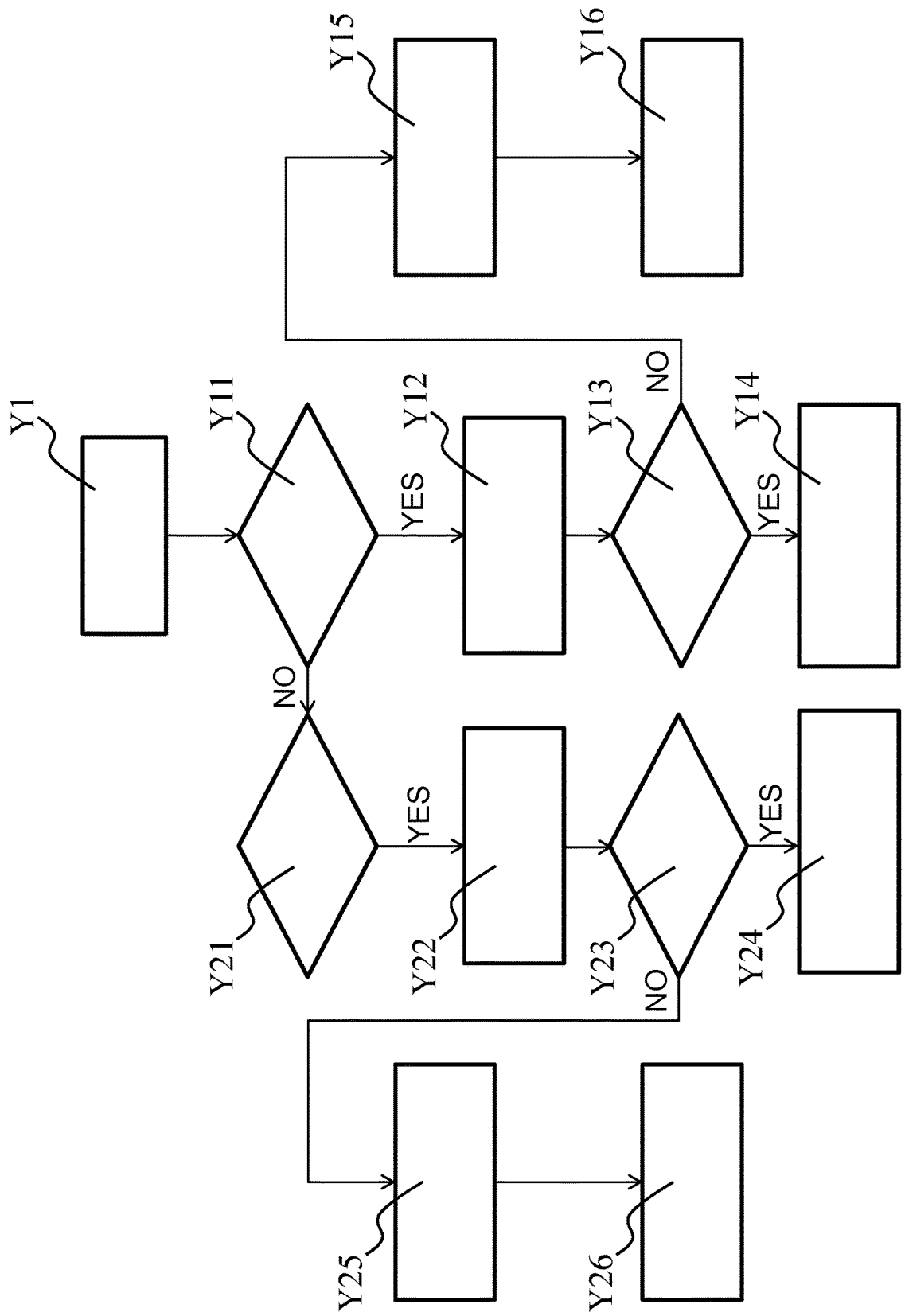
FIG. 8 illustrates an exemplary flowchart of the air-conditioning system.

FIG. 8 illustrates the steps of another exemplary operation mode of an air-conditioning system 300' in FIG. 7. In step Y, the air-conditioning system 300' starts up and step Y11 then proceeds. In step Y11, the system will determine whether the temperature of the external environment measured by the external environment temperature sensor T7 is higher than the temperature of the indoors measured by the indoor temperature sensor T6. If the determined outcome in step Y11 is affirmative, a cooling mode operation is selected and the system proceeds with step Y12. In step Y12, the controller 600 will open the fifteenth control valve 397 to make the third pump 30 to pump water from the first water storage tank 11 to supply water to the auxiliary coiled pipe 390 in order to pre-cool the airflow running through the air-handling unit 310'. If the auxiliary coiled pipe 390 starts the pre-cool process, the system proceeds with step Y13. In step Y13, the system will determine whether the temperature of airflow in the air-handling unit 310' measured by the temperature sensor T5 is lower than or equal to a predetermined airflow temperature. If the determined outcome in step Y13 is affirmative, the system will proceed with step Y14. In step Y14, the air-conditioning system 300' keeps utilizing the water pumped from the first water storage tank 11 by the third pump 30 to supply water to the auxiliary coiled pipe 390 in order to regulate the temperature of the indoor space 400 by pre-cooling the airflow in the air-handling unit 310'. If the determined outcome in Y13 is false, it means that the temperature of airflow output by the air-handling unit 310' is higher than the predetermined airflow temperature, and the system will then proceed with step Y15. In step Y15, the controller 600 of the air-conditioning system 300' will open the sixteenth control valve 349 to convey the chilled water from the main system to the cooling coiled pipe 340 in order to further cool down the airflow in the air-handling unit 310' which has been pre-cooled by the auxiliary coiled pipe 390. The system will then proceed with step Y16, and the controller of the air-conditioning system 300' will adjust the open degree of the fifteenth control valve 397 and the sixteenth control valve 349 individually to make the temperature of the airflow measured by the temperature sensor T5 in the air-handling unit 310' reach the predetermined airflow temperature.

Besides, if the determined outcome in step Y11 is false, the operation of the warming mode is selected and the system proceeds with step Y21. In step Y21, the system will again determine whether the external temperature measured by the external environment temperature sensor T7 is lower than the indoor temperature measured by the indoor temperature sensor T6. If the determined outcome of Y21 is affirmative, the system will proceed with step Y22. In step Y22, the controller 600 will open the seventeenth control valve 398 to pump water from the second water storage tank 21 with the fourth pump 40 to supply the auxiliary coiled pipe 390 in order to pre-heat the airflow running through the air-handling unit 310'. After the auxiliary coiled pipe 390 starts to pre-heat the airflow, the system will proceed with step Y23. In step Y23, the system will determine whether the temperature of the airflow measured by the temperature sensor T5 in the air-handling unit 310' is higher or equal to a predetermined airflow temperature. If the determined outcome in step Y23 is affirmative, the system will proceed with step Y24. In step Y24, the air-conditioning system 300' keeps utilizing the water pumped from the second water storage tank 21 by the fourth pump 40 to supply water to the auxiliary coiled pipe 390 in order to regulate the temperature of the indoor space 400 by pre-heating the airflow in the air-handling unit 310'. If the determined outcome in step Y23 is false, it means that the temperature of airflow running through the air-handling unit 310' is lower than the predetermined airflow temperature, and the system will then proceed with step Y25. In step Y25, the controller 600 of the air-conditioning system 300' will open the eighteenth control valve 359 and convey hot water from the main system to heat the coiled pipe 350 in order to heat the airflow in the air-handling unit 310' after the air flow is pre-heated by the auxiliary coiled pipe 390. The system then proceeds with step Y26, and the controller 600 of the air-conditioning system 300' will adjust the degrees of opening of the seventeenth control valve 398 and the eighteenth control valve 359 individually to make the temperature of airflow measured by the temperature sensor T5 in the air-handling unit 310' reach the predetermined airflow temperature. With the operation of the air-conditioning system 300' illustrated in FIG. 8, the thermal energy recycled by the first water storage tank 11 and the second water storage tank 21 of thermal equilibrium system of the invention can be appropriately utilized as a supportive energy source for the energy-saving air-conditioning system to reduce energy consumption.

In summary, based on the thermal equilibrium system for the building and its operation modes provided by the same, as well as the air-conditioning system utilizing the thermal energy recycled by thermal equilibrium system and the operation manner thereof, the underground thermal energy, waste heat generated from home appliances and energy generated from green energy apparatuses can be effectively utilized to achieve the goals of reducing energy consumption and maintaining the indoor air quality simultaneously. Even if the actual energy consumption exceeds the load of the thermal system mentioned above and the main system is required to be activated, the embodiment provided above can still be a supportive system for reducing energy consumption.

The embodiments mentioned above are the technical aspects and traits of the invention, and are meant to be understood and carried out by a person ordinarily skilled in the art. It shall not limit the claims of the invention. Variation and modification are possible within the scope of the foregoing disclosure and the claims to the invention.

| [DESCRIPTION OF THE SYMBOLS] | |
| --- | --- |
| 1 | thermal equilibrium system |
| 10 | first energy-recovery apparatus |
| 11 | first water storage tank |
| 12 | foundation pile |
| 13 | first heat-exchanging pipeline |
| 14 | first pipeline |
| 15 | third pipeline |
| 16 | first control valve |
| 17 | third control valve |
| 18 | first pump |
| 20 | second energy-recovery apparatus |
| 21 | second water storage tank |
| 22 | first home appliance |
| 23 | second heat-exchanging pipeline |
| 24 | second pipeline |
| 25 | fourth pipeline |
| 26 | second control valve |
| 27 | fourth control valve |
| 28 | second pump |
| 30 | third pump |
| 40 | fourth pump |
| 50 | indoor coiled pipe |
| 60 | second home appliance |
| 70 | third energy-recovery apparatus |
| 71 | third home appliance |
| 73 | third heat-exchanging pipeline |
| 74 | fifth pump |
| 80 | green energy apparatus |
| 81 | solar panel |
| 82 | micro wind turbine |
| 83 | power collecting panel |
| 211 | electrical heating apparatus |
| 300 | air-conditioning system |
| 300' | air-conditioning system |
| 310 | air-handling unit |
| 310' | air-handling unit |
| 320 | air intake |
| 330 | air outtake |
| 340 | cooling coiled pipe |
| 341 | chilled water inlet pipe |

[DESCRIPTION OF THE SYMBOLS]

| | |
|---|---|
| 342 | chilled water outlet pipe |
| 343 | first auxiliary pipe |
| 344 | seventh control valve |
| 345 | third auxiliary pipe |
| 346 | eighth control valve |
| 347 | ninth control valve |
| 348 | tenth control valve |
| 349 | sixteenth control valve |
| 350 | heating coiled pipe |
| 351 | hot water inlet pipe |
| 352 | hot water outlet pipe |
| 353 | second auxiliary pipe |
| 354 | eleventh control valve |
| 355 | fourth auxiliary pipe |
| 356 | twelfth control valve |
| 357 | thirteenth control valve |
| 358 | fourteenth control valve |
| 359 | eighteenth control valve |
| 360 | humidifier |
| 370 | fan |
| 380 | filter layer |
| 381 | primary filter |
| 382 | secondary filter |
| 390 | auxiliary coiled pipe |
| 391 | auxiliary water inlet pipe |
| 392 | auxiliary water outlet pipe |
| 393 | fifth auxiliary pipe |
| 394 | sixth auxiliary pipe |
| 395 | seventh auxiliary pipe |
| 396 | eighth auxiliary pipe |
| 397 | fifteenth control valve |
| 398 | seventeenth control valve |
| 400 | indoor space |
| 401 | return air damper |
| 500 | external environment |
| 501 | external air damper |
| 600 | controller |
| C1 | indoor CO2 concentration sensor |
| L1 | first liquid level sensor |
| L2 | second liquid level sensor |
| M1 | indoor humidity sensor |
| P1 | PM 2.5 sensor |
| S | external water source |
| S1 | fifth control valve |
| S2 | sixth control valve |
| T1 | first temperature sensor |
| T2 | second temperature sensor |
| T3 | third temperature sensor |
| T4 | fourth temperature sensor |
| T5 | temperature sensor |
| T6 | indoor temperature sensor |
| T7 | external environment temperature sensor |
| U1 | step |
| U2 | step |
| U3 | step |
| U4 | step |
| U5 | step |
| U6 | step |
| U7 | step |
| U8 | step |
| V1 | step |
| V10 | step |
| V2 | step |
| V3 | step |
| V4 | step |
| V5 | step |
| V6 | step |
| V7 | step |
| V8 | step |
| V9 | step |
| W1 | step |
| W2 | step |
| W3 | step |
| W4 | step |
| W5 | step |
| W6 | step |
| W7 | step |
| X1 | step |
| X2 | step |
| X3 | step |
| X4 | step |
| X5 | step |
| X6 | step |
| X7 | step |
| Y | step |
| Y11 | step |
| Y12 | step |
| Y13 | step |
| Y14 | step |
| Y15 | step |
| Y16 | step |
| Y21 | step |
| Y22 | step |
| Y23 | step |
| Y24 | step |
| Y25 | step |
| Y26 | step |

[Deposite of Biomaterials]
None

[Biological Sequence Table]
None

The invention claimed is:

1. A thermal equilibrium system, for a building, comprising:
a first energy-recovery apparatus, comprising:
a first water storage tank;
a foundation pile, connected to a lower part of an architectural structure of the building;
a first heat-exchanging pipeline, connected to the first water storage tank for performing heat exchange with the foundation pile, so that water in the first heat-exchanging pipeline is heated to a first temperature range; and
a first pump, disposed between the first water storage tank and the first heat-exchanging pipeline, and configured to pump the water in the first water storage tank to circulate the water between the first water storage tank and the first heat-exchanging pipeline; and
a second energy-recovery apparatus, comprising:
a second water storage tank;
at least one first home appliance, wherein the at least one first home appliance generates first thermal energy during operation;
a second heat-exchanging pipeline, connected to the second water storage tank for performing heat exchange with the at least one first home appliance, to absorb the first thermal energy generated by the at least one first home appliance during operation, thereby heating water in the second heat-exchanging pipeline to a second temperature range; and
a second pump, disposed between the second water storage tank and the second heat-exchanging pipeline, and configured to pump the water in the second water storage tank to circulate the water between the second water storage tank and the second heat-exchanging pipeline, wherein
the second temperature range is broader than the first temperature range.

2. The thermal equilibrium system according to claim 1, further comprising:
a third pump, connected to the first water storage tank and the second water storage tank, and configured to pump water out of at least one of the first water storage tank and the second water storage tank to output the water to an indoor coiled pipe; and a fourth pump, connected to the first water storage tank and the second water storage tank, and configured to pump water out of at least one of the first water storage tank and the second water storage tank to output the water to at least one second home appliance.

3. The thermal equilibrium system according to claim 2, wherein a first control valve is disposed between the third pump and the first water storage tank, to control the output of the water from the first water storage tank through the third pump, and a second control valve is disposed between the third pump and the second water storage tank, to control the output of water from the second water storage tank through the third pump, and wherein a third control valve is disposed between the fourth pump and the first water storage tank, to control the output of water from the first water storage tank through the fourth pump, and a fourth control valve is disposed between the fourth pump and the second water storage tank, to control the output of the water from the second water storage tank through the fourth pump.

4. The thermal equilibrium system according to claim 3, wherein the first water storage tank is provided with a first temperature sensor and a first liquid level sensor, the second water storage tank is provided with a second temperature sensor and a second liquid level sensor, and the thermal equilibrium system is further provided with a third temperature sensor to measure a temperature of water output by the third pump and a fourth temperature sensor to measure a temperature of water output by the fourth pump.

5. The thermal equilibrium system according to claim 4, wherein when the temperature of the water output by the fourth pump measured by the fourth temperature sensor is higher than 30° C., and the temperature of the water of the second water storage tank measured by the second temperature sensor is higher than 30° C., and when a liquid level of the second water storage tank measured by the second liquid level sensor is greater than 20% of a liquid level height of the second water storage tank, the first control valve is closed, and the second control valve is opened, to enable the third pump to only pump water out of the second water storage tank to output the water to the indoor coiled pipe.

6. The thermal equilibrium system according to claim 4, wherein when a liquid level of the second water storage tank measured by the second liquid level sensor is less than 20% of a liquid level height of the second water storage tank, and the temperature of the water output by the fourth pump measured by the fourth temperature sensor is lower than 30° C., and when the temperature of the water of the first water storage tank measured by the first temperature sensor is higher than 25° C., and the liquid level of the first water storage tank measured by the first liquid level sensor is greater than 20% of a liquid level height of the first water storage tank, the third control valve is opened to enable the fourth pump to pump water out of the first water storage tank to output the water to the at least one second home appliance.

7. The thermal equilibrium system according to claim 6, wherein the second water storage tank further comprises an electrical heating apparatus, wherein when the third control valve is opened to enable the fourth pump to pump water out of the first water storage tank to use the water or output the water to the at least one second home appliance, the electrical heating apparatus starts to heat the water in the second water storage tank to a temperature higher than or equal to 35° C.

8. The thermal equilibrium system according to claim 1, further comprising an external water source, a fifth control valve, and a sixth control valve, wherein the external water source is connected to the first water storage tank and the second water storage tank separately, to supplement volume of water of the first water storage tank and the second water storage tank, wherein the fifth control valve controls the external water source to supplement volume of water of the first water storage tank, and the sixth control valve controls the external water source to supplement the volume of water of the second water storage tank.

9. The thermal equilibrium system according to claim 1, wherein the at least one first home appliance comprises a refrigerator, heating furnace, or an oven, and the at least one second home appliance comprises a water heater, a water heating bottle, a washing machine, a dishwasher, or a water heating bag.

10. The thermal equilibrium system according to claim 1, further comprising a third energy-recovery apparatus, comprising:
at least one third home appliance, wherein the at least one third home appliance generates second thermal energy during operation;
a third heat-exchanging pipeline, connected to the second water storage tank for performing heat exchange with the at least one second home appliance, so as to absorb the second thermal energy generated by the at least one second home appliance during operation, thereby heating water in the third heat-exchanging pipeline to a third temperature range; and
a fifth pump, disposed between the second water storage tank and the third heat-exchanging pipeline, and configured to pump water in the second water storage tank to circulate the water between the second water storage tank and the third heat-exchanging pipeline, wherein the second temperature range is approximately close to the third temperature range.

11. The thermal equilibrium system according to claim 10, further comprising a green energy apparatus, wherein the green energy apparatus can generate electric energy and is connected to an electrical heating apparatus in the second water storage tank, to heat water in the second water storage tank, wherein the green energy apparatus comprises a solar panel or a micro wind turbine mounted on the building, and wherein the at least one third home appliance comprises an air conditioner.

12. An air-conditioning system, comprising:
the thermal equilibrium system according to claim 2;
an air-handling unit, comprising:
an air intake, capable of sucking an airflow from at least one of an external environment and an indoor space of the building;
an air outtake, capable of conveying the airflow to the indoor space of the building;
a fan, located between the air intake and the air outtake, to blow the airflow from the air intake of the air-handling unit to the air outtake;
a cooling coiled pipe, located between the air intake and the air outtake, and configured to perform heat exchange with the airflow to cool the airflow, wherein the cooling coiled pipe is connected to a chilled water inlet pipe and a chilled water outlet pipe; and
a heating coiled pipe, located between the air intake and the air outtake, and configured to perform heat exchange with the airflow to heat the airflow, wherein the heating coiled pipe is connected to a hot water inlet pipe and a hot water outlet pipe;

wherein the third pump of the thermal equilibrium system can pump water from the first water storage tank to convey the water through a first auxiliary pipe connected to the chilled water inlet pipe to the cooling coiled pipe; and wherein the fourth pump of the thermal equilibrium system can pump water from the second water storage tank to convey the water through a second auxiliary pipe connected to the hot water inlet pipe to the heating coiled pipe.

13. The air-conditioning system according to claim 12, wherein the first auxiliary pipe comprises a seventh control valve, to control a volume of water of the first water storage tank input through the first auxiliary pipe to the chilled water inlet pipe, wherein there is a third auxiliary pipe between the chilled water outlet pipe and the first water storage tank, so that water of the cooling coiled pipe can be conveyed from the chilled water outlet pipe through the third auxiliary pipe to the first water storage tank, and wherein the third auxiliary pipe comprises an eighth control valve, to control a volume of water conveyed back by the chilled water outlet pipe to the first water storage tank.

14. The air-conditioning system according to claim 13, wherein the chilled water inlet pipe comprises a ninth control valve, to control a volume of inlet water of the chilled water inlet pipe, and the first auxiliary pipe is located between the ninth control valve and the cooling coiled pipe, and wherein the chilled water outlet pipe comprises a tenth control valve, to control a volume of outlet water of the chilled water outlet pipe, and the third auxiliary pipe is located between the tenth control valve and the cooling coiled pipe.

15. The air-conditioning system according to claim 14, wherein the air-handling unit comprises a temperature sensor, to measure a temperature of an airflow supplied by the air-handling unit, wherein when the temperature of the airflow measured by the temperature sensor reaches a predetermined airflow temperature, and when individual degrees of opening of the ninth control valve and the tenth control valve are less than 20%, the seventh control valve and the eighth control valve are opened, to enable the third pump of the thermal equilibrium system to pump water from the first water storage tank to mix the water with the chilled water entered through the chilled water inlet pipe in the first auxiliary pipe, to supply the mixed water to the cooling coiled pipe.

16. The air-conditioning system according to claim 15, wherein when the temperature of the airflow measured by the temperature sensor is maintained at the predetermined airflow temperature, the individual degrees of opening of the seventh control valve and the eighth control valve are maintained to maintain a mixture ratio of the water of the first water storage tank to the chilled water of the chilled water inlet pipe, and when the temperature of the airflow measured by the temperature sensor cannot be maintained at the predetermined airflow temperature, the individual openings of the seventh control valve and the eighth control valve are adjusted to adjust the mixture ratio of the water of the first water storage tank to the chilled water of the chilled water inlet pipe until the temperature of the airflow measured by the temperature sensor is maintained at the predetermined airflow temperature.

17. The air-conditioning system according to claim 12, wherein there is a fourth auxiliary pipe between the hot water outlet pipe and the second water storage tank, so that water of the heating coiled pipe can be conveyed from the hot water outlet pipe through the fourth auxiliary pipe to the second water storage tank, and wherein the second auxiliary pipe comprises an eleventh control valve, to control a volume of water of the second water storage tank input by the second auxiliary pipe to the hot water inlet pipe, and the fourth auxiliary pipe comprises a twelfth control valve, to control a volume of water conveyed back by the hot water outlet pipe to the second water storage tank.

18. The air-conditioning system according to claim 17, wherein the hot water inlet pipe comprises a thirteenth control valve, to control a volume of inlet water of the hot water inlet pipe, and the second auxiliary pipe is located between the thirteenth control valve and the heating coiled pipe, and wherein the hot water outlet pipe comprises a fourteenth control valve, to control a volume of outlet water of the hot water outlet pipe, and the fourth auxiliary pipe is located between the fourteenth control valve and the heating coiled pipe.

19. The air-conditioning system according to claim 18, wherein when the temperature of the airflow measured by the temperature sensor reaches a predetermined airflow temperature, and when individual degrees of opening of the thirteenth control valve and the fourteenth control valve are less than 20%, the eleventh control valve and the twelfth control valve are opened, to enable the fourth pump of the thermal equilibrium system to pump water from the second water storage tank to mix the water with hot water entered from the hot water inlet pipe in the second auxiliary pipe, to supply the mixed water to the heating coiled pipe.

20. The air-conditioning system according to claim 19, wherein when the temperature of the airflow measured by the temperature sensor is maintained at the predetermined airflow temperature, the individual degrees of opening of the eleventh control valve and the twelfth control valve are maintained to maintain a mixture ratio of the water of the second water storage tank to the hot water of the hot water inlet pipe, and when the temperature of the airflow measured by the temperature sensor cannot be maintained at the predetermined airflow temperature, the individual degrees of opening of the eleventh control valve and the twelfth control valve are adjusted to adjust the mixture ratio of the water of the second water storage tank to the hot water of the hot water inlet pipe until the temperature of the airflow measured by the temperature sensor is maintained at the predetermined airflow temperature.

21. The air-conditioning system according to claim 12, wherein at least one of a primary filter and a secondary filter is provided close to the air intake inside the air-handling unit, and wherein the indoor space of the building is provided with at least one of an indoor temperature sensor, an indoor humidity sensor, and an indoor $CO_2$ concentration sensor.

22. The air-conditioning system according to claim 21, wherein the air-handling unit comprises a humidifier, and when the indoor humidity sensor senses that the humidity of the indoor space is lower than a predetermined humidity value, the humidifier starts to humidify the airflow in the air-handling unit.

23. The air-conditioning system according to claim 21, comprising an external air damper and a return air damper, wherein the external air damper enables the air intake of the air-handling unit to suck air from the external environment, and the return air damper enables the air intake of the air-handling unit to suck air from the indoor space, wherein when a $CO_2$ concentration of the indoor space measured by the indoor $CO_2$ concentration sensor is higher than a predetermined $CO_2$ concentration value, individual degrees of opening of the external air damper and the return air damper are controlled to control a mixture ratio of air of the external environment to air of the indoor space, to reach the predetermined $CO_2$ concentration value.

24. The air-conditioning system according to claim 22, further comprising an external environment temperature sensor and a PM2.5 sensor for monitoring the external environment, wherein when a temperature of the external environment measured by the external environment temperature sensor is lower than a predetermined indoor temperature, an opening of the external air damper is increased to increase a volume of air sucked from the external environment, and when a PM2.5 value of the external environment measured by the PM2.5 sensor is higher than a predetermined PM2.5 limit value, a predetermined $CO_2$ concentration value of the indoor space is used as a standard for controlling individual degrees of opening of the external air damper and the return air damper.

25. An air-conditioning system, comprising:
the thermal equilibrium system according to claim 2;
an air-handling unit, comprising:
an air intake, capable of sucking an airflow from at least one of an external environment and an indoor space of the building;
an air outtake, capable of conveying the airflow to the indoor space of the building;
a fan, located between the air intake and the air outtake, to blow the airflow from the air intake of the air-handling unit to the air outtake;
a cooling coiled pipe, located between the air intake and the air outtake, and configured to perform heat exchange with the airflow to cool the airflow, wherein the cooling coiled pipe is connected to a chilled water inlet pipe and a chilled water outlet pipe;
a heating coiled pipe, located between the air intake and the air outtake, and configured to perform heat exchange with the airflow to heat the airflow, wherein the heating coiled pipe is connected to a hot water inlet pipe and a hot water outlet pipe; and
an auxiliary coiled pipe, located after the air intake and before the cooling coiled pipe and the heating coiled pipe, and configured to perform heat exchange with the airflow to cool or heat the airflow, wherein the auxiliary coiled pipe is connected to an auxiliary water inlet pipe and an auxiliary water outlet pipe, wherein
the third pump of the thermal equilibrium system may pump water from the first water storage tank to the auxiliary water inlet pipe, to convey the water to the auxiliary coiled pipe; and
the fourth pump of the thermal equilibrium system may pump water from the second water storage tank to the auxiliary water inlet pipe, to convey the water to the auxiliary coiled pipe.

26. The air-conditioning system according to claim 25, wherein there is a fifteenth control valve between the first water storage tank and the auxiliary water inlet pipe, to control a volume of water input from the first water storage tank to the auxiliary water inlet pipe, wherein one of the chilled water inlet pipe and the chilled water outlet pipe comprises a sixteenth control valve, to control a volume of water entering the cooling coiled pipe through the chilled water inlet pipe, wherein there is a seventeenth control valve between the second water storage tank and the auxiliary water inlet pipe, to control a volume of water input from the second water storage tank to the auxiliary water inlet pipe, and wherein one of the hot water inlet pipe and the hot water outlet pipe comprises an eighteenth control valve, to control a volume of water entering the heating coiled pipe through the hot water inlet pipe.

27. The air-conditioning system according to claim 26, wherein the air-handling unit comprises a temperature sensor, to measure a temperature of an airflow supplied by the air-handling unit, wherein in a cold room mode, when the temperature of the airflow measured by the temperature sensor reaches a predetermined airflow temperature, the fifteenth control valve is opened, to enable the third pump of the thermal equilibrium system to pump water from the first water storage tank through the water inlet pipe of the auxiliary pipe to supply the water to the auxiliary coiled pipe to pre-cool the airflow, and a degree of opening of the sixteenth control valve is reduced to reduce a volume of inlet water from the chilled water inlet pipe to the cooling coiled pipe.

28. The air-conditioning system according to claim 27, wherein when the temperature of the airflow measured by the temperature sensor is maintained at the predetermined airflow temperature, individual degrees of opening of the fifteenth control valve and the sixteenth control valve are maintained, and when the temperature of the airflow measured by the temperature sensor cannot be maintained at the predetermined airflow temperature, the individual openings of the fifteenth control valve and the sixteenth control valve are adjusted, to adjust a volume of water entering the auxiliary coiled pipe from the first water storage tank and a volume of water entering the chilled water inlet pipe from the cooling coiled pipe until the temperature of the airflow measured by the temperature sensor is maintained at the predetermined airflow temperature.

29. The air-conditioning system according to claim 26, wherein the air-handling unit comprises a temperature sensor, to measure a temperature of an airflow supplied by the air-handling unit, wherein in a warm room mode, when the temperature of the airflow measured by the temperature sensor reaches a predetermined airflow temperature, the seventeenth control valve is opened, to enable the fourth pump of the thermal equilibrium system to pump water from the second water storage tank through the auxiliary pipe water inlet pipe to supply the water to the auxiliary coiled pipe to pre-heat the airflow, and a degree of opening of the eighteenth control valve is reduced to reduce a volume of inlet water from the hot water inlet pipe to the heating coiled pipe.

30. The air-conditioning system according to claim 29, wherein when the temperature of the airflow measured by the temperature sensor is maintained at the predetermined airflow temperature, individual degrees of opening of the seventeenth control valve and the eighteenth control valve are maintained, and when the temperature of the airflow measured by the temperature sensor cannot be maintained at the predetermined airflow temperature, the individual degrees of opening of the seventeenth control valve and the eighteenth control valve are adjusted, to adjust a volume of water entering the auxiliary coiled pipe from the second water storage tank and a volume of water entering the hot water inlet pipe from the heating coiled pipe until the temperature of the airflow measured by the temperature sensor is maintained at the predetermined airflow temperature.

31. The air-conditioning system according to claim 26, wherein the indoor space of the building comprises at least one of an indoor temperature sensor, an indoor humidity sensor, and an indoor $CO_2$ concentration sensor, and further comprises an external environment temperature sensor, and wherein the air-conditioning system comprises an external air damper and a return air damper, the external air damper enables the air intake of the air-handling unit to suck air from the external environment, and the return air damper enables the air intake of the air-handling unit to suck air from the indoor space.

32. The air-conditioning system according to claim 31, wherein in a cold room mode, when an external environment temperature measured by the external environment temperature sensor is higher than a temperature of the indoor space measured by the indoor temperature sensor, the fifteenth control valve is opened to supply water from the first water storage tank through the auxiliary pipe water inlet pipe to the auxiliary coiled pipe to pre-cool the airflow.

33. The air-conditioning system according to claim 32, wherein the air-handling unit comprises a temperature sensor, to measure a temperature of an airflow supplied by the air-handling unit, when the temperature of the airflow supplied by the air-handling unit measured by the temperature sensor is higher than a predetermined airflow temperature, the sixteenth control valve is opened to enable the chilled water inlet pipe to supply water to the cooling coiled pipe, to further cool the airflow to the predetermined airflow temperature.

34. The air-conditioning system according to claim 31, wherein in a warm room mode, when an external environment temperature measured by the external environment temperature sensor is lower than a temperature of the indoor space measured by the indoor temperature sensor, the seventeenth control valve is opened to supply water from the second water storage tank through the auxiliary pipe water inlet pipe to the auxiliary coiled pipe to pre-heat the airflow.

35. The air-conditioning system according to claim 34, wherein the air-handling unit comprises a temperature sensor, to measure a temperature of an airflow supplied by the air-handling unit, and when the temperature of the airflow supplied by the air-handling unit measured by the temperature sensor is lower than a predetermined airflow temperature, the eighteenth control valve is opened to enable the hot water inlet pipe to supply water to the heating coiled pipe to further heat the airflow to the predetermined airflow temperature.

36. The air-conditioning system according to claim 35, wherein the air-handling unit comprises a humidifier, and when the humidity of the indoor space measured by the indoor humidity sensor is lower than a predetermined humidity value, the humidifier starts to humidify the airflow in the air-handling unit, and wherein at least one of a primary filter and a secondary filter is provided close to the air intake inside the air-handling unit.

* * * * *